(12) United States Patent
Scott

(10) Patent No.: US 11,558,110 B2
(45) Date of Patent: *Jan. 17, 2023

(54) ADAPTIVE SELF-OPTIMIZING NETWORK USING CLOSED-LOOP FEEDBACK

(71) Applicant: The Boeing Company, Chicago, IL (US)

(72) Inventor: James P. Scott, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,903

(22) Filed: Jun. 19, 2020

(65) Prior Publication Data

US 2020/0322045 A1 Oct. 8, 2020

Related U.S. Application Data

(63) Continuation-in-part of application No. 16/228,627, filed on Dec. 20, 2018, now Pat. No. 11,050,616.
(Continued)

(30) Foreign Application Priority Data

Feb. 10, 2020 (AU) .................................. 2020200945
Feb. 10, 2020 (EP) ..................................... 20156478
(Continued)

(51) Int. Cl.
*H04B 7/185* (2006.01)

(52) U.S. Cl.
CPC ..... *H04B 7/18519* (2013.01); *H04B 7/18513* (2013.01)

(58) Field of Classification Search
CPC .............. H04B 7/1851; H04B 7/18513; H04B 7/18519; H04B 7/18543; H04L 41/0823
See application file for complete search history.

(56) References Cited

U.S. PATENT DOCUMENTS

| 8,867,390 | B2 * | 10/2014 | Chen | ..................... | H04L 1/0017 370/252 |
| 2005/0007993 | A1 * | 1/2005 | Chambers | ............. | H04W 24/02 370/349 |

(Continued)

OTHER PUBLICATIONS

"Extended European Search Report Received For Application No. 20156478.8-1216", dated Aug. 17, 2020, 10 Pages.
(Continued)

*Primary Examiner* — Mohamed A. Wasel

(57) ABSTRACT

A system and method for an adaptive network of network access nodes comprises a global network operations center (GNOC) receiving operator inputs and generating a global policy according to the operator inputs. The GNOC and/or a distributed network gateway (GW) generate configuration commands for configurations for at least one of the network access nodes based on the global policy, transmit the configuration commands to at least one of the network access nodes, and receive telemetry from at least one of the network access nodes. The distributed network GW transmits a summary of key performance indicators (KPIs) to the GNOC and the GNOC revises the global policy according to the summary of KPIs.

20 Claims, 16 Drawing Sheets

Related U.S. Application Data which is a continuation-in-part of application No. 16/228,678, filed on Dec. 20, 2018, now Pat. No. 10,771,989.

(30) Foreign Application Priority Data

Feb. 10, 2020 (RU) .......................... RU2020106082
Feb. 12, 2020 (CN) .......................... 202010087606.9
Feb. 14, 2020 (JP) .......................... 2020-023232

(56) References Cited

U.S. PATENT DOCUMENTS

| | | |
|---|---|---|
| 2007/0064604 A1 | 3/2007 | Chen et al. |
| 2007/0124502 A1 | 5/2007 | Li |
| 2010/0309812 A1 | 12/2010 | Marquez et al. |
| 2016/0037434 A1* | 2/2016 | Gopal .................. H04B 7/1851 370/316 |
| 2016/0062795 A1* | 3/2016 | Hu ...................... H04L 67/1008 718/104 |
| 2017/0310546 A1 | 10/2017 | Nair et al. |
| 2018/0069899 A1* | 3/2018 | Lang .................... G06F 3/0482 |
| 2018/0098247 A1* | 4/2018 | Gopal ................ H04B 7/18519 |
| 2018/0241635 A1* | 8/2018 | Rao .................... H04L 41/0897 |
| 2019/0364457 A1* | 11/2019 | Szilagyi ................ H04L 47/803 |

OTHER PUBLICATIONS

"Australian Patent Examination Report Received For Application No. 2020200945", dated Feb. 11, 2021, 10 Pages.

\* cited by examiner

ADAPTIVE SELF-OPTIMIZING NETWORK USING CLOSED-LOOP FEEDBACK

CROSS-REFERENCE TO RELATED APPLICATION

This application is a Continuation-In-Part of U.S. patent application Ser. No. 16/228,627, filed on Dec. 20, 2018, and U.S. patent application Ser. No. 16/228,678 filed on Dec. 20, 2018, the entire disclosures of which are expressly incorporated by reference herein.

This application claims priority to Australia Patent Application No. 2020200945 filed on Feb. 10, 2020, Russia Patent Application No. 2020106082 filed on Feb. 10, 2020, Europe Patent Application No. 20156478.8 filed on Feb. 10, 2020, China Patent Application No. 202010087606.9 filed on Feb. 12, 2020, and Japan Patent Application No. 2020-023232 filed on Feb. 14, 2020, the entire disclosures of which are expressly incorporated by reference herein.

FIELD

The present disclosure relates to networks, such as mobile wireless (e.g., cellular, satellite, tactical military, etc.) networks. In particular, the present disclosure relates to adaptive self-optimizing networks using closed-loop feedback.

BACKGROUND

Currently, configurations (e.g., payload configurations) of satellite networks are changed manually according to changing user demand for satellite resources (e.g., loading patterns), ambient environmental conditions, and/or system performance (e.g., including failures). In particular, a satellite's payload configuration is changed by a ground station manually generating and sending payload configuration command signals to the satellite. This conventionally used, manual procedure is very tedious and time consuming for the satellite operator. In addition, since this conventional procedure is manually-driven and does not incorporate closed-loop feedback, there is no self-organization and self-optimization capability.

In light of the foregoing, there is a need for an improved technology for adapting configurations to adapt the network to changes in user mobility and capacity demands.

SUMMARY

The present disclosure relates to a method, system, and apparatus for an adaptive self-optimizing network using closed-loop feedback. In one or more embodiments, a method for an adaptive network of vehicles comprises receiving, by a global network operations center (GNOC), operator inputs. The method further comprises generating, by the GNOC, a global policy according to the operator inputs. Also, the method comprises generating, by the GNOC and/or a local gateway (GW), configuration commands for configurations for at least one of the vehicles based on the global policy. In addition, the method comprises transmitting, by the GNOC and/or the local GW, the configuration commands to at least one of the vehicles. Additionally, the method comprises transmitting, by the local GW, key performance indicators to the GNOC. Also, the method comprises revising, by the GNOC, the global policy according to the key performance indicators. Further, the method comprises repeating steps of the method above that follow the generating of the global policy by the GNOC.

In one or more embodiments, the method further comprises generating, by a regional network operations center (RNOC), a regional policy. In at least one embodiment, the method further comprises revising, by the GNOC, the global policy according to the regional policy. In some embodiments, the regional policy comprises admission control, mobility management, channel allocations, carrier allocations, bearer allocations, power management, and/or forward/return (FWD/RTN) scheduling. In one or more embodiments, the RNOC is located within a gateway (GW).

In at least one embodiment, the GNOC is located within a gateway (GW). In some embodiments, the global policy comprises beam allocations, capacity allocations, software-defined network (SDN) management, and/or admission control policy. In one or more embodiments, the operator inputs comprise frequency spectrum planning, traffic planning, and/or contingency plans. In some embodiments, the key performance indicators comprise subscriber demand, modem power profiles, beam/carrier utilization, session blocking rates, remote access channel (RACH) success rates, bearer success rates, session setup latency, and/or handover success rates.

In one or more embodiments, the vehicles are space vehicles, airborne vehicles, terrestrial vehicles, or marine vehicles. In at least one embodiment, the space vehicles are satellites. In some embodiments, the satellites comprise a geosynchronous earth orbit (GEO) satellite constellation, a low earth orbit (LEO) satellite constellation, a medium earth orbit (MEO) satellite constellation, a super GEO satellite constellation, or a hybrid satellite constellation.

In at least one embodiment, the method further comprises generating, by the GNOC and/or the local GW, extensible markup language (XML) models for the configurations for at least one of the vehicles according to the global policy. In some embodiments, the method further comprises generating, by the GNOC and/or the local GW, the configuration commands according to the XML models.

In one or more embodiments, the method further comprises transmitting, by at least one of the vehicles, telemetry to the GNOC and/or the local GW.

In at least one embodiment, a system for an adaptive network of vehicle comprises a global network operations center (GNOC) configured to receive operator inputs, to generate a global policy according to the operator inputs, to generate configuration commands for configurations for at least one of the vehicles based on the global policy, and to revise the global policy according to key performance indicators. The system further comprises a local gateway (GW) configured to transmit the key performance indicators to the GNOC. In one or more embodiments, the local gateway (GW) and/or the GNOC are further configured to transmit the configuration commands to at least one of the vehicles.

In one or more embodiments, the system further comprises a regional network operations center (RNOC) configured to generate a regional policy. In some embodiments, the GNOC is further configured to revise the global policy according to the regional policy.

In at least one embodiment, a method for configuring a configuration for a vehicle comprises generating XML models for the configuration for the vehicle. The method further comprises generating configuration commands for the vehicle according to the XML models. Further, the method comprises configuring the configuration for the vehicle according to the configuration commands. In some embodiments, the XML models are generated according to a global policy.

In one or more embodiments, a method for sharing network resources comprises receiving, by a network operations center (NOC), user demand for users from an external network. The method further comprises receiving, by the NOC, key performance indicators from at least one internal network. Also, the method comprises determining, by the NOC, whether at least one internal network has available resources by analyzing the key performance indicators and the user demand. Further, the method comprises allowing, by the NOC when the NOC determines that there are available resources, at least some of the users from the external network to connect to at least one internal network according to the available resources.

In at least one embodiment, the method further comprises connecting at least some of the users from the external network to at least one internal network via at least one user-to-network interface (UNI). In some embodiments, the external network is connected to the at least one internal network via at least one external network-to-network interface (ENNI). In one or more embodiments, the NOC controls operations of the at least one internal network. In at least one embodiment, when there are more than one of the internal networks, the internal networks are connected to each other via at least one internal network-to-network interface (INNI). In some embodiments, users from at least one internal network are connected to the at least one internal network via at least one user-to-network interface (UNI).

In one or more embodiments, the external network and at least one internal network each comprise a vehicle, a router, a network operating system (NOS), an open virtual switch (OVS), a backbone edge bridge (BEB), a backbone core bridge (BCB), a virtual network function (VNF), and/or provider backbone bridging-traffic engineering (PBB-TE). In at least one embodiment, the vehicle is a space vehicle, an airborne vehicle, a terrestrial vehicle, or a marine vehicle. In some embodiments, the space vehicle is a satellite, and the satellite is a geosynchronous earth orbit (GEO) satellite, a low earth orbit (LEO) satellite, a medium earth orbit (MEO) satellite, or a super GEO satellite.

In at least one embodiment, a software defined network (SDN) controller of the NOC controls connections of at least one external network-to-network interface (ENNI), at least one internal network-to-network interface (INNI), and at least one user-to-network interface (UNI).

In one or more embodiments, a system for sharing network resources comprises an external network, and at least one internal network. The system further comprises a network operations center (NOC) configured to receive user demand for users from the external network, to receive key performance indicators from at least one internal network, to determine whether at least one internal network has available resources by analyzing the key performance indicators and the user demand, and to allow, when the NOC determines that there are available resources, at least some of the users from the external network to connect to at least one internal network according to the available resources.

In at least one embodiment, at least some of the users from the external network are connected to at least one internal network via at least one user-to-network interface (UNI). In one or more embodiments, the NOC is configured to control operations of the at least one internal network. In one or more embodiments, a software defined network (SDN) controller of the NOC is configured to control connections of at least one external network-to-network interface (ENNI), at least one internal network-to-network interface (INNI), and at least one user-to-network interface (UNI).

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

Figure 1:
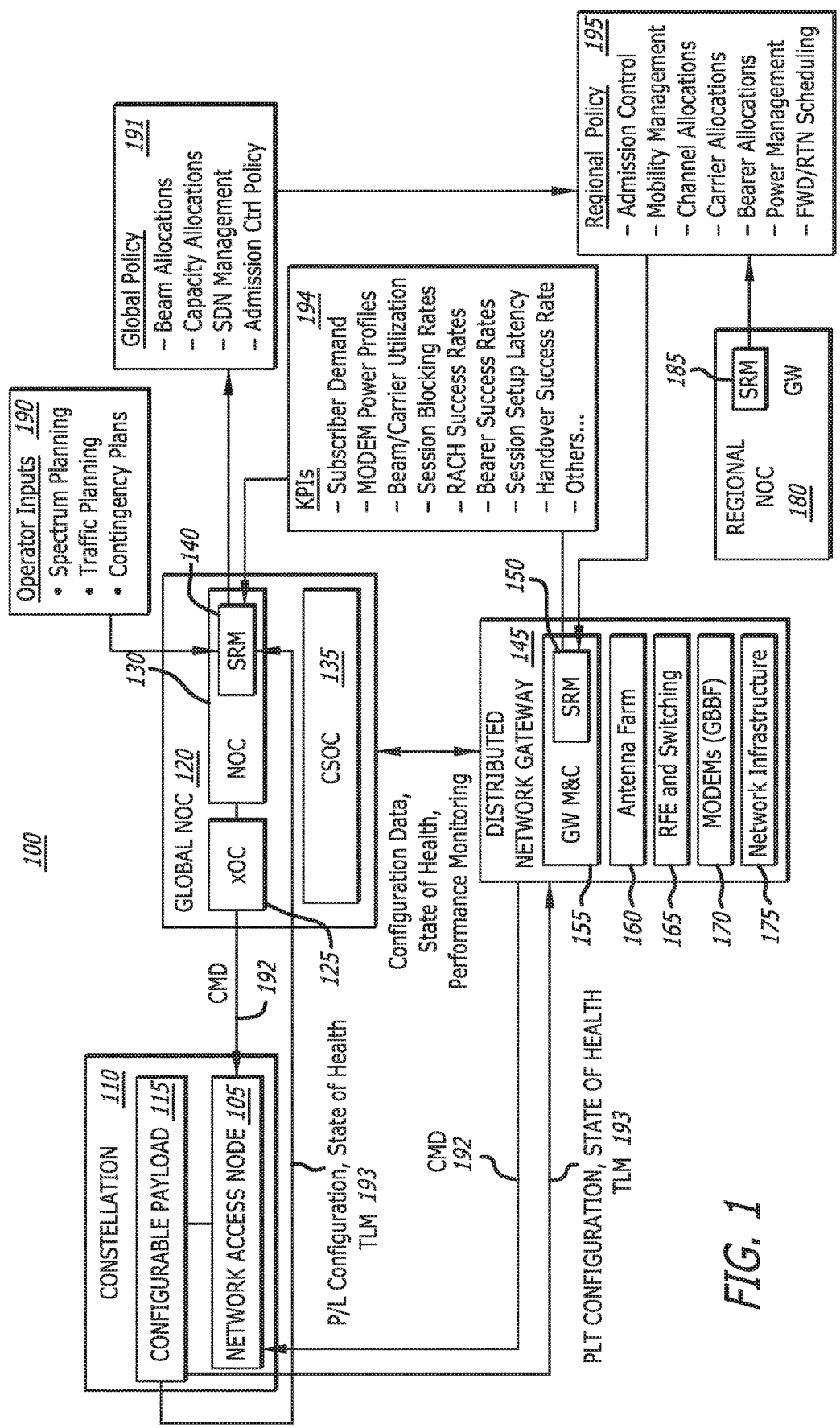
FIG. 1 is a block diagram showing the management architecture for the disclosed system for an adaptive self-optimizing network using closed-loop feedback, in accordance with at least one embodiment of the present disclosure.
Figure 3A:
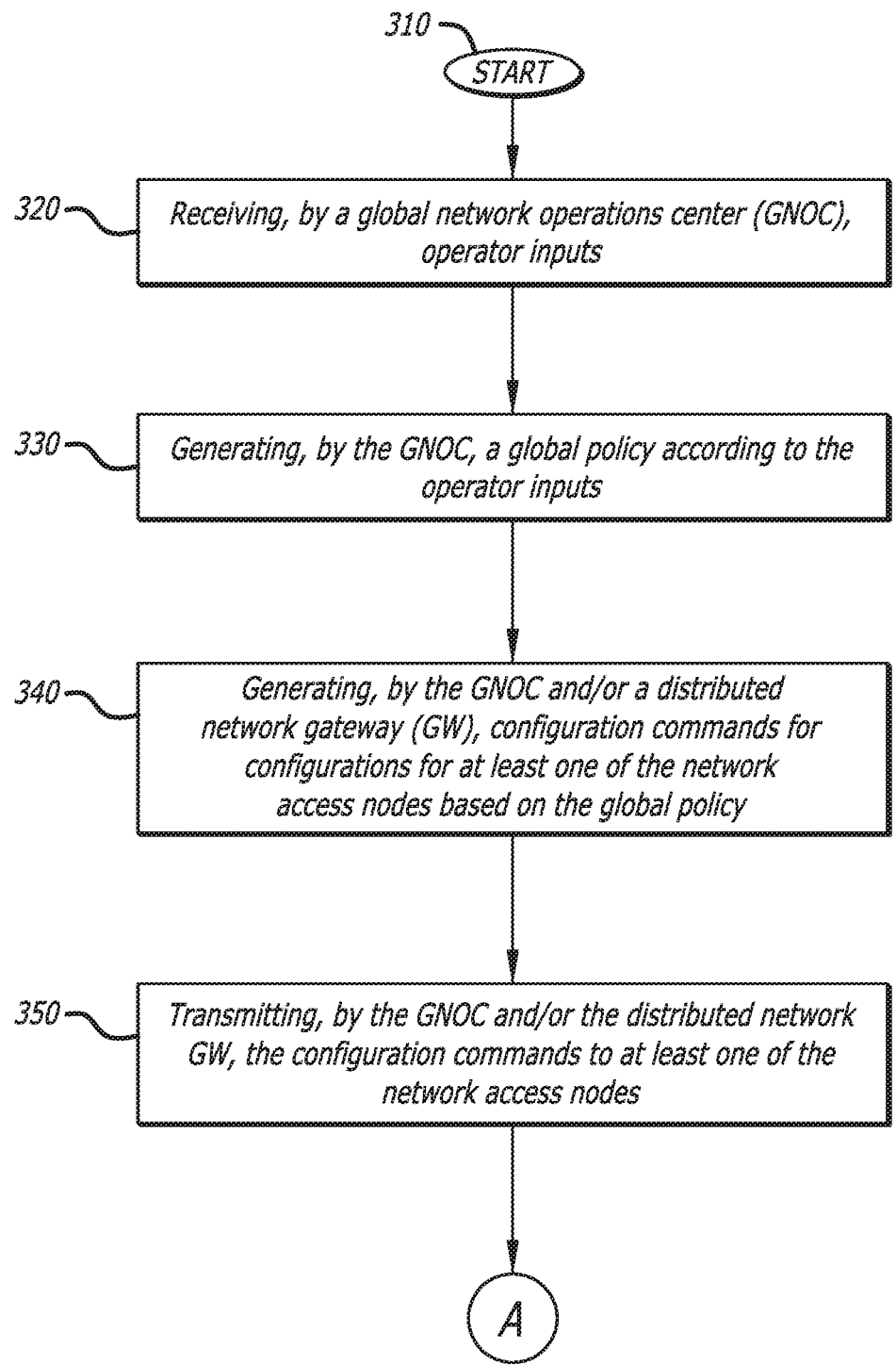
Figure 3B:
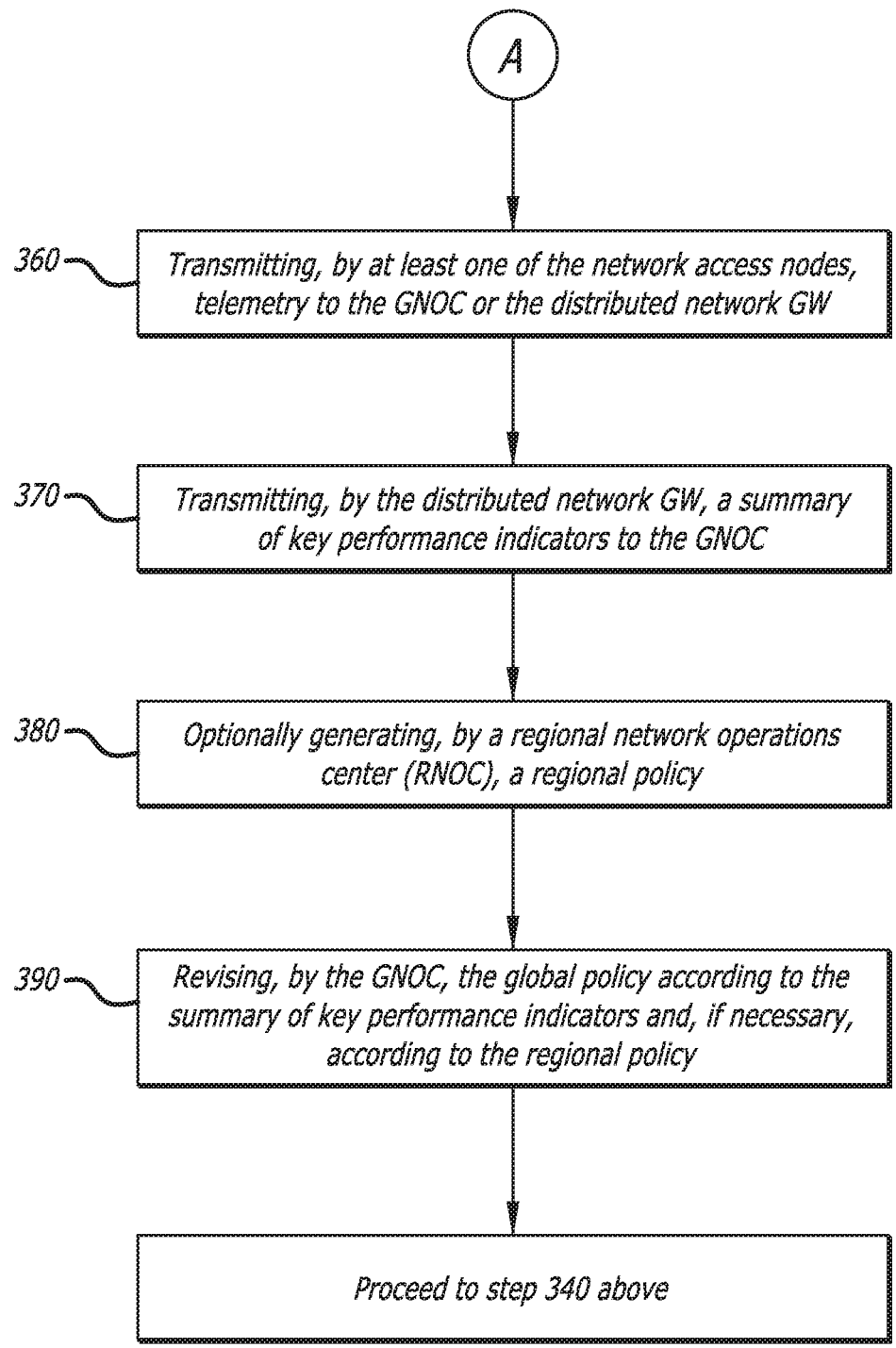

FIGS. 3A and 3B together form a flow chart showing the method for operation of the disclosed system for an adaptive self-optimizing network using closed-loop feedback relating to FIG. 1, in accordance with at least one embodiment of the present disclosure.

Figure 4:
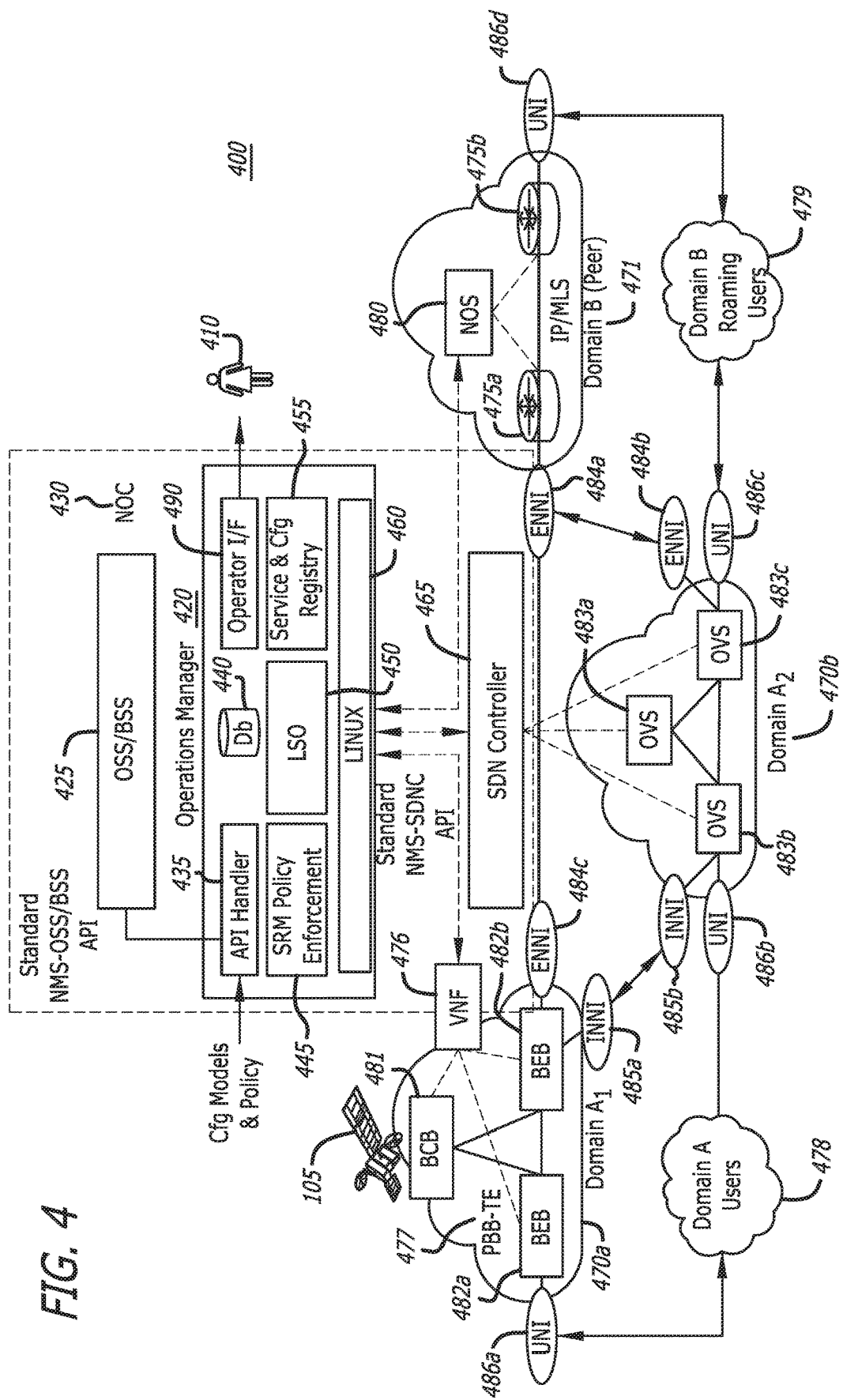

FIG. 4 is a diagram showing the top level architecture for the disclosed system for an adaptive self-optimizing network using closed-loop feedback, in accordance with at least one embodiment of the present disclosure.

Figure 5:
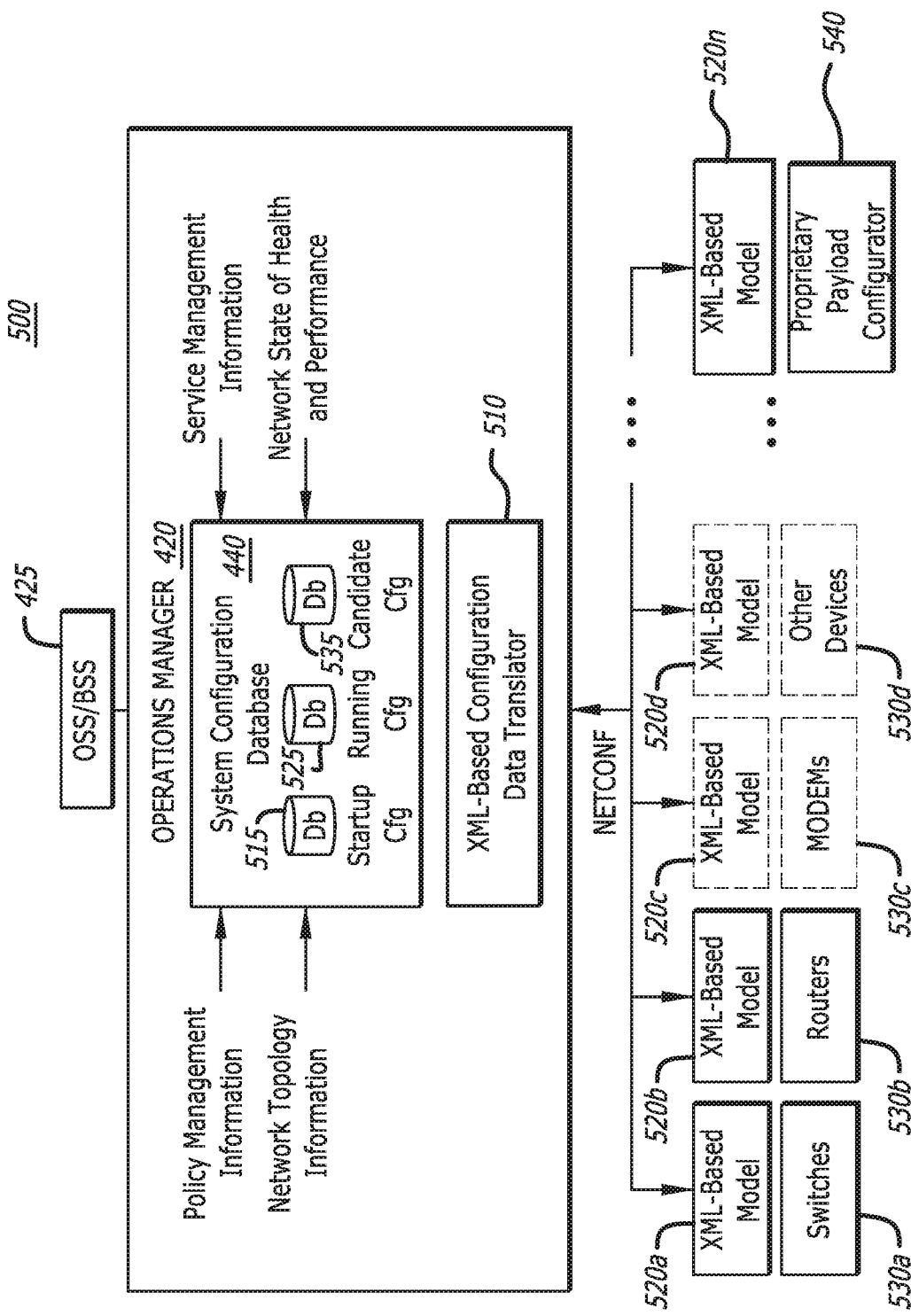

FIG. 5 is a diagram showing further details of the operations manager of FIG. 4, in accordance with at least one embodiment of the present disclosure.

Figure 6:
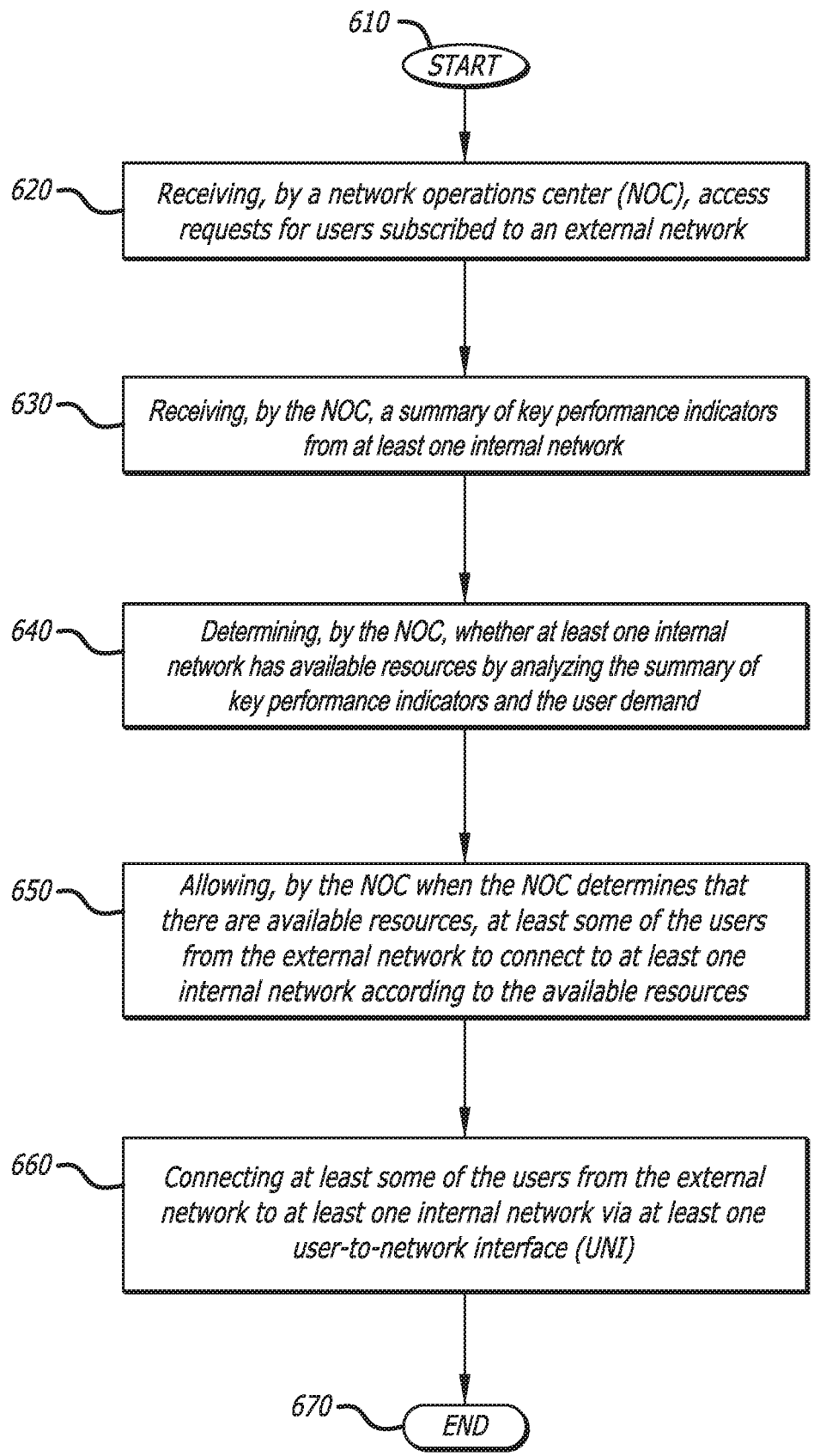

FIG. 6 is a flow chart showing the method for operation of the disclosed system for an adaptive self-optimizing network using closed-loop feedback relating to FIG. 4, in accordance with at least one embodiment of the present disclosure.

Figure 7:
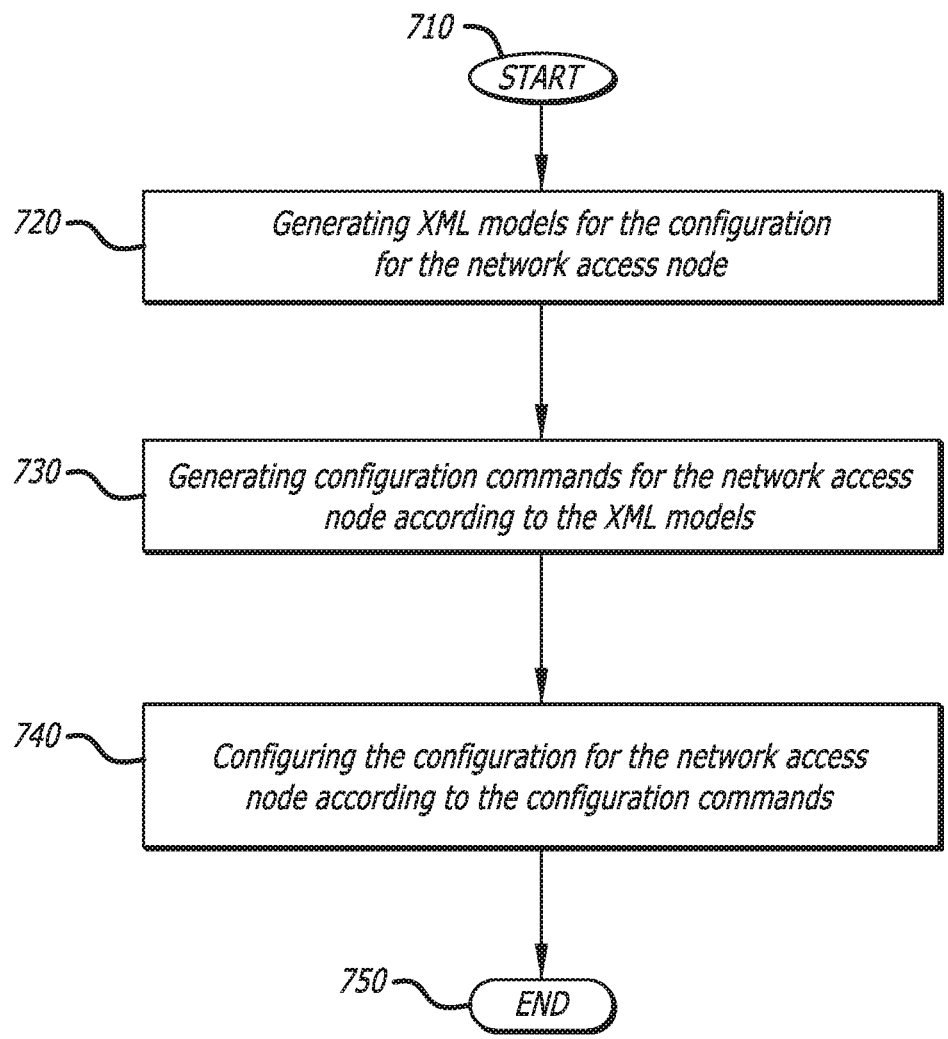

FIG. 7 is a flow chart showing the method for configuring a configuration for a network access node relating to FIG. 5, in accordance with at least one embodiment of the present disclosure.

Figure 8:
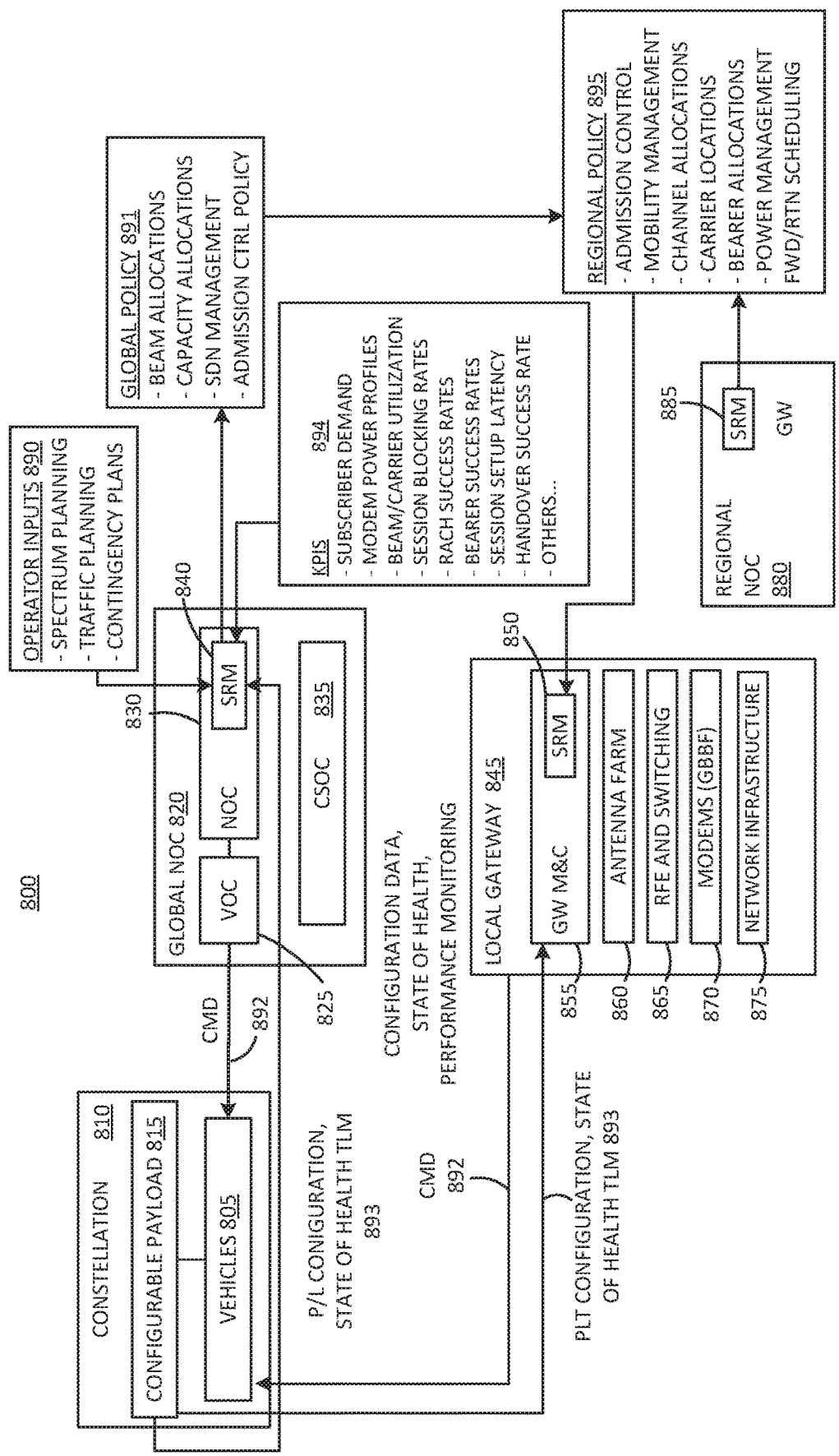

FIG. 8 is a block diagram showing the management architecture for the disclosed system for an adaptive self-optimizing network using closed-loop feedback, in accordance with at least one embodiment of the present disclosure.

Figure 9:
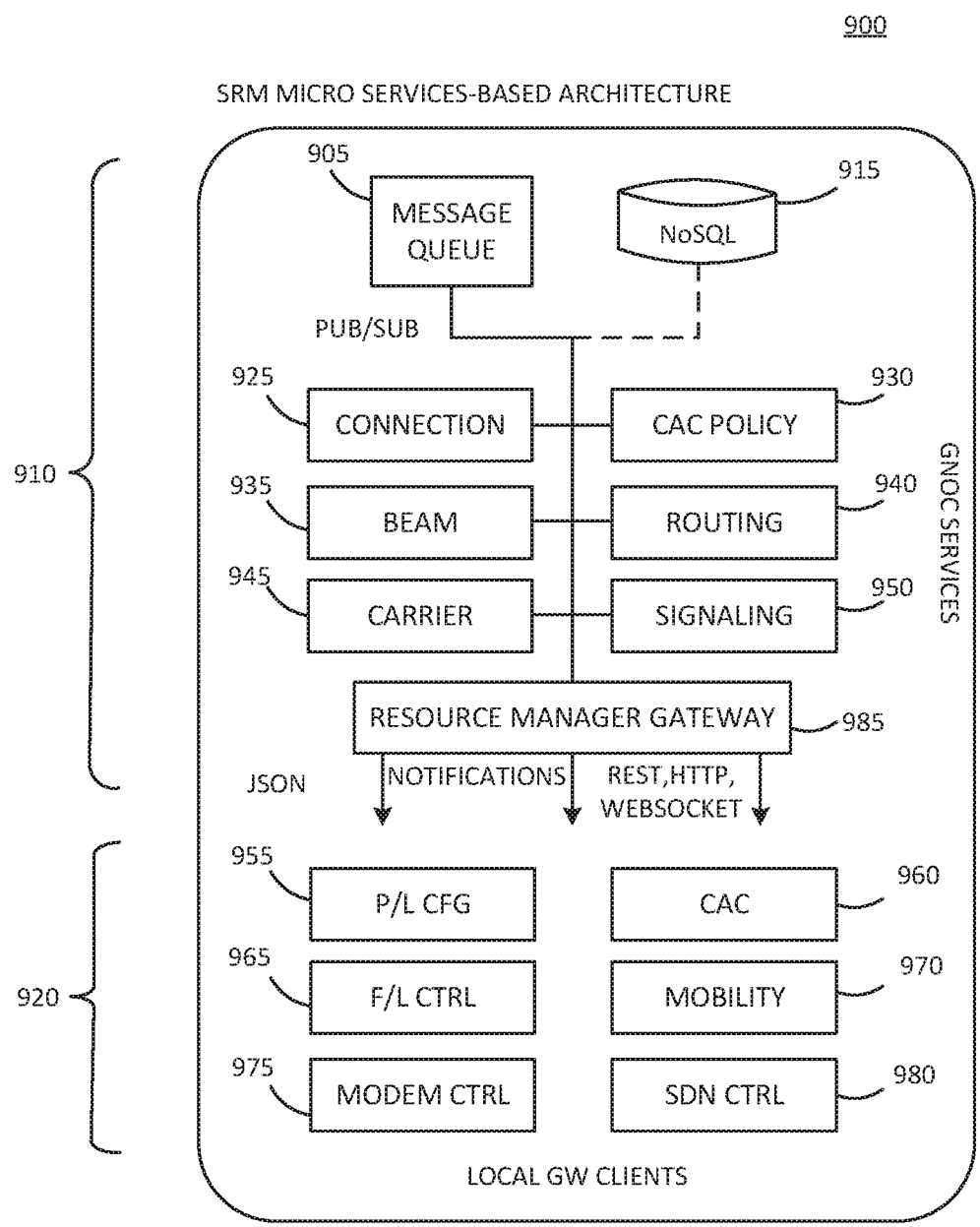

FIG. 9 is a block diagram showing the distributed functional architecture for the disclosed system for an adaptive self-optimizing network using closed-loop feedback, in accordance with at least one embodiment of the present disclosure.

Figure 10A:
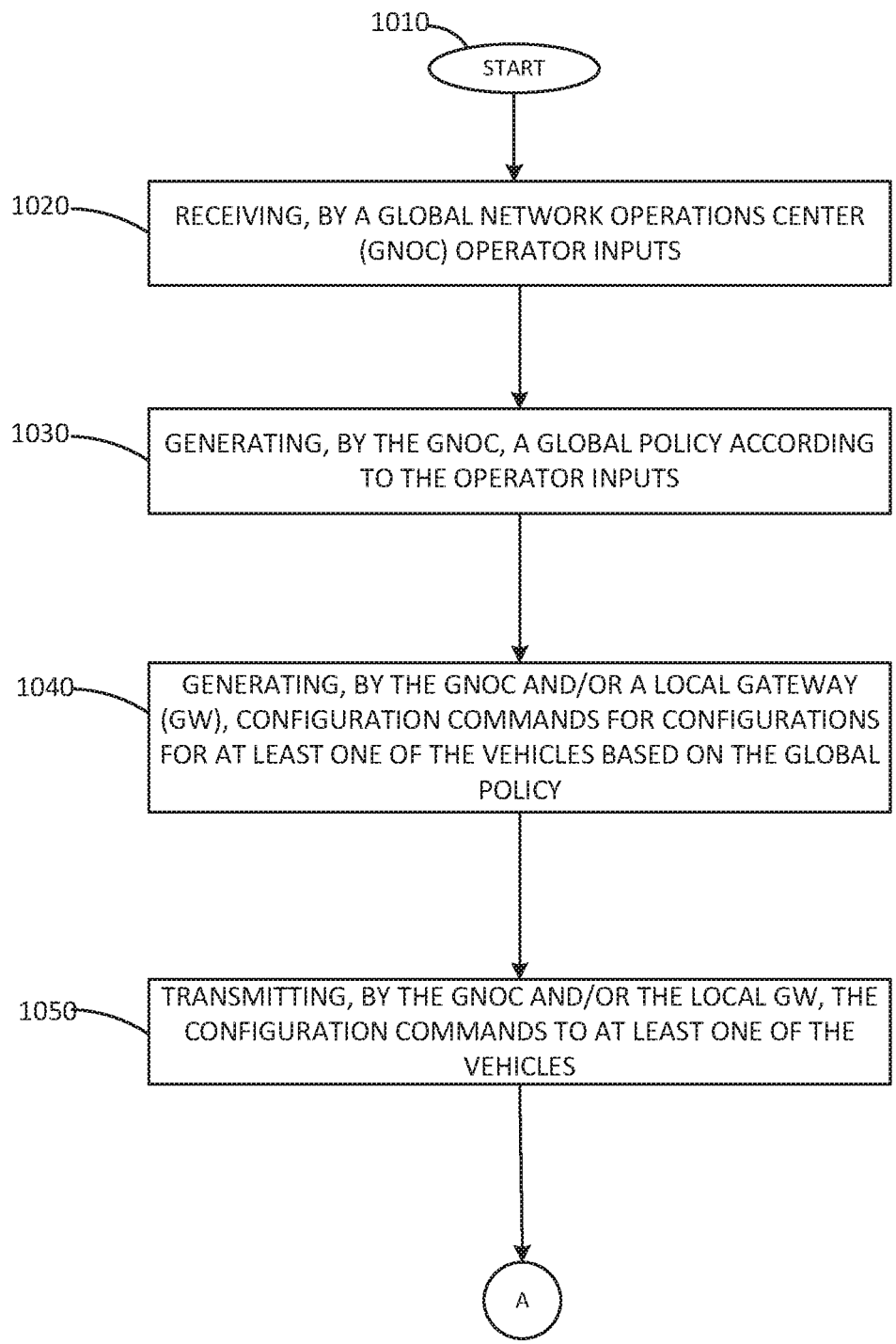
Figure 10B:
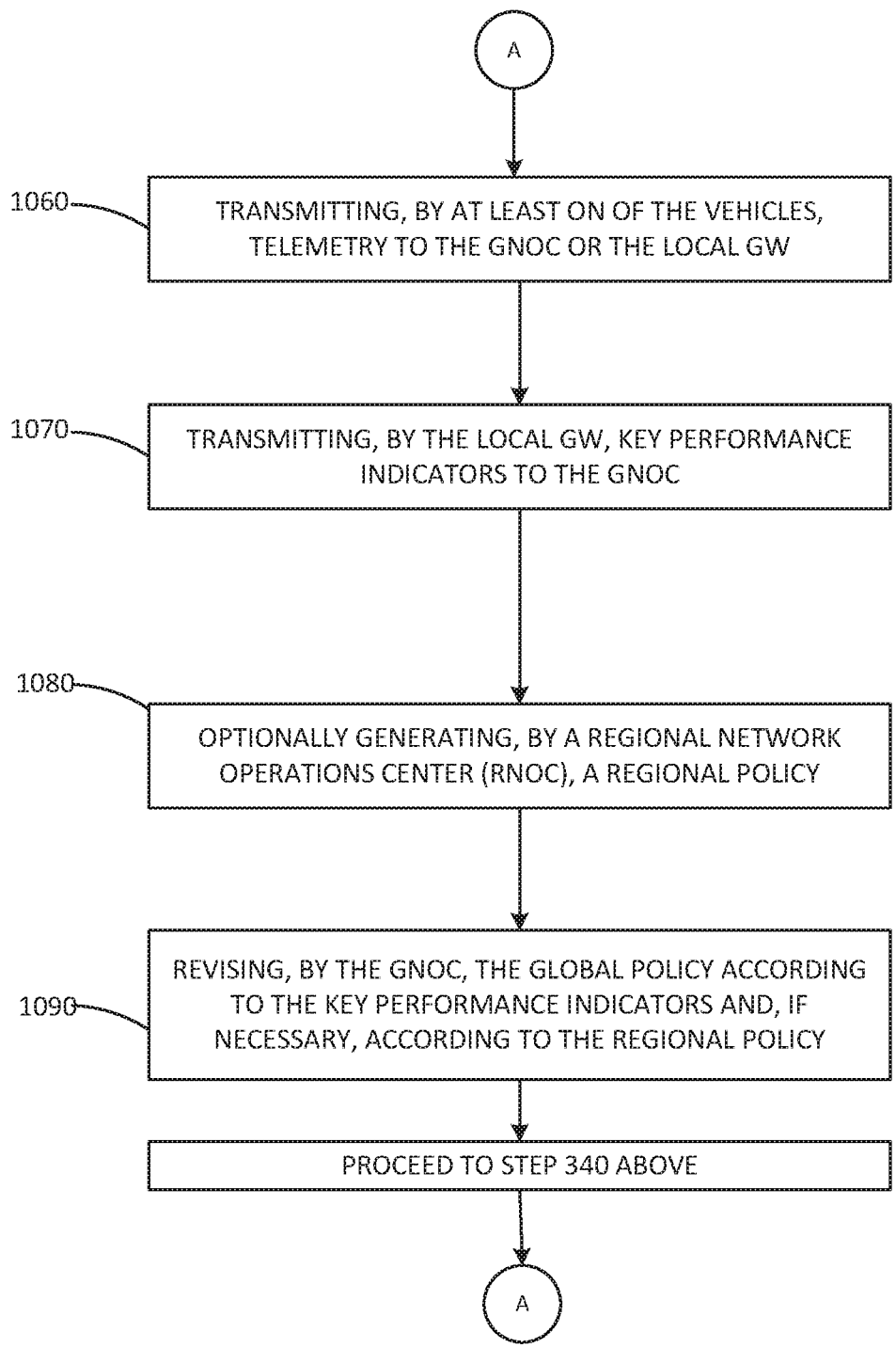

FIGS. 10A and 10B together form a flow chart showing the method for operation of the disclosed system for an adaptive self-optimizing network using closed-loop feedback relating to FIG. 8, in accordance with at least one embodiment of the present disclosure.

Figure 11:
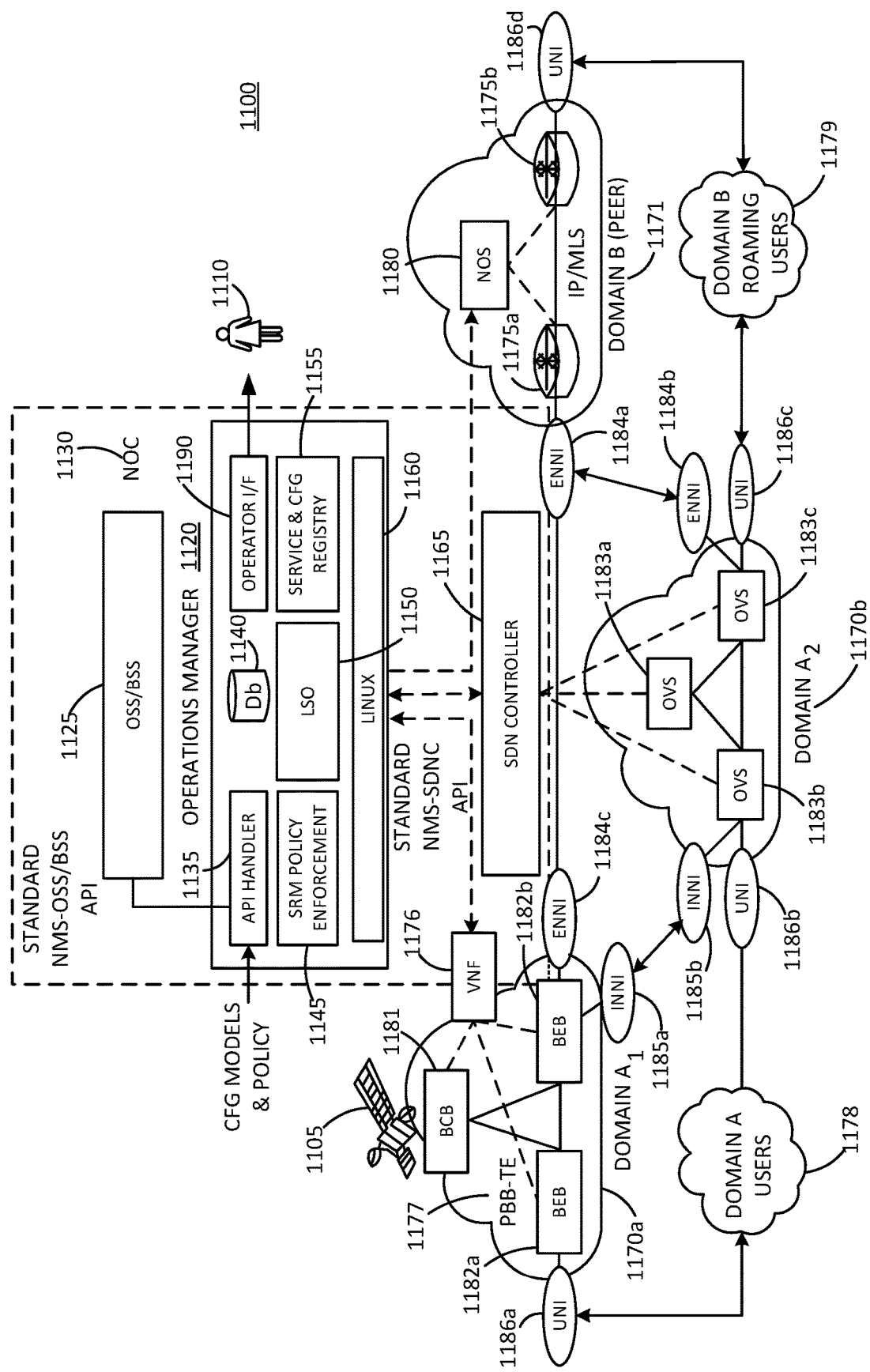

FIG. 11 is a diagram showing the top level architecture for the disclosed system for an adaptive self-optimizing network using closed-loop feedback, in accordance with at least one embodiment of the present disclosure.

Figure 12:
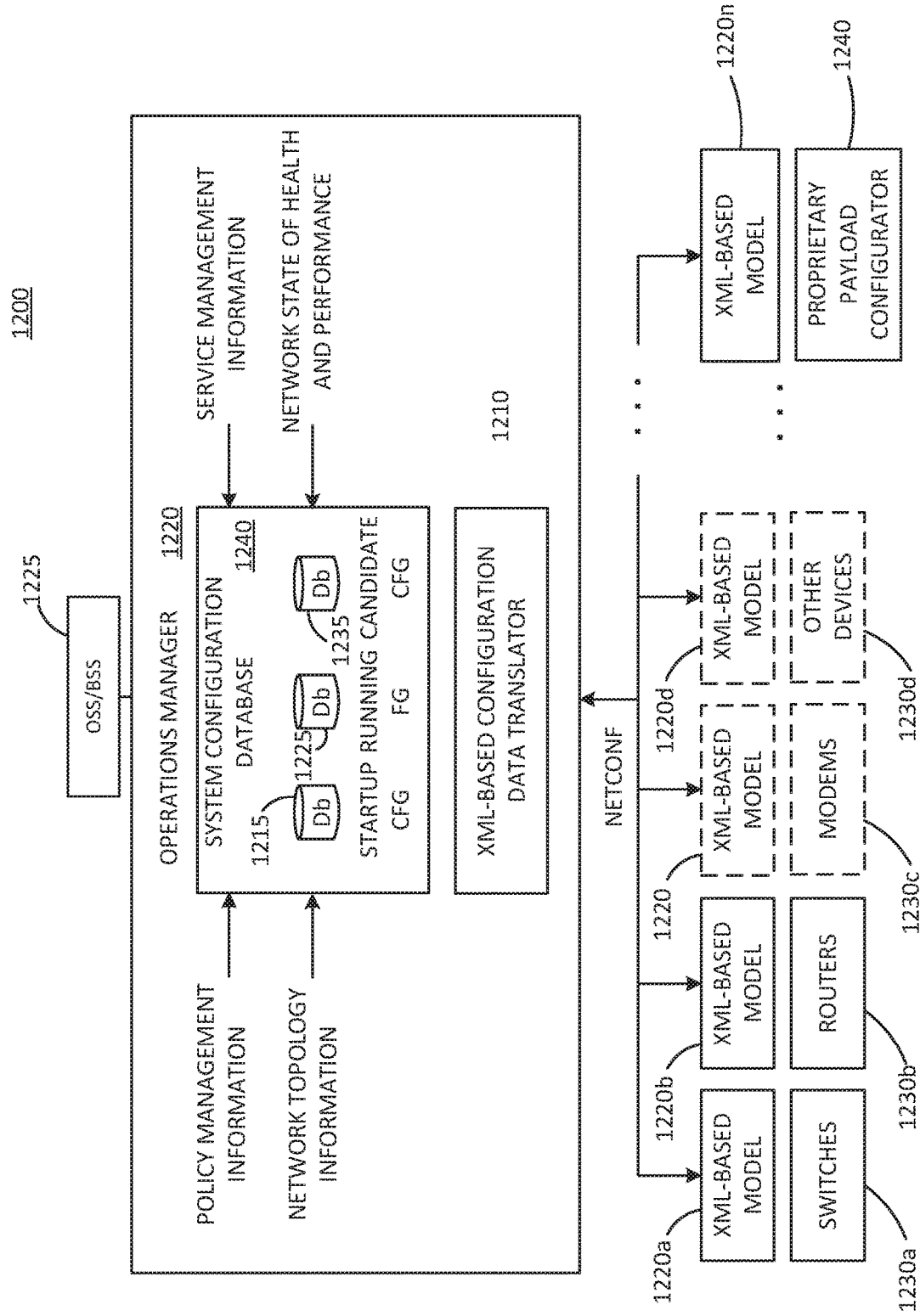

FIG. 12 is a diagram showing further details of the operations manager of FIG. 11, in accordance with at least one embodiment of the present disclosure.

Figure 13:
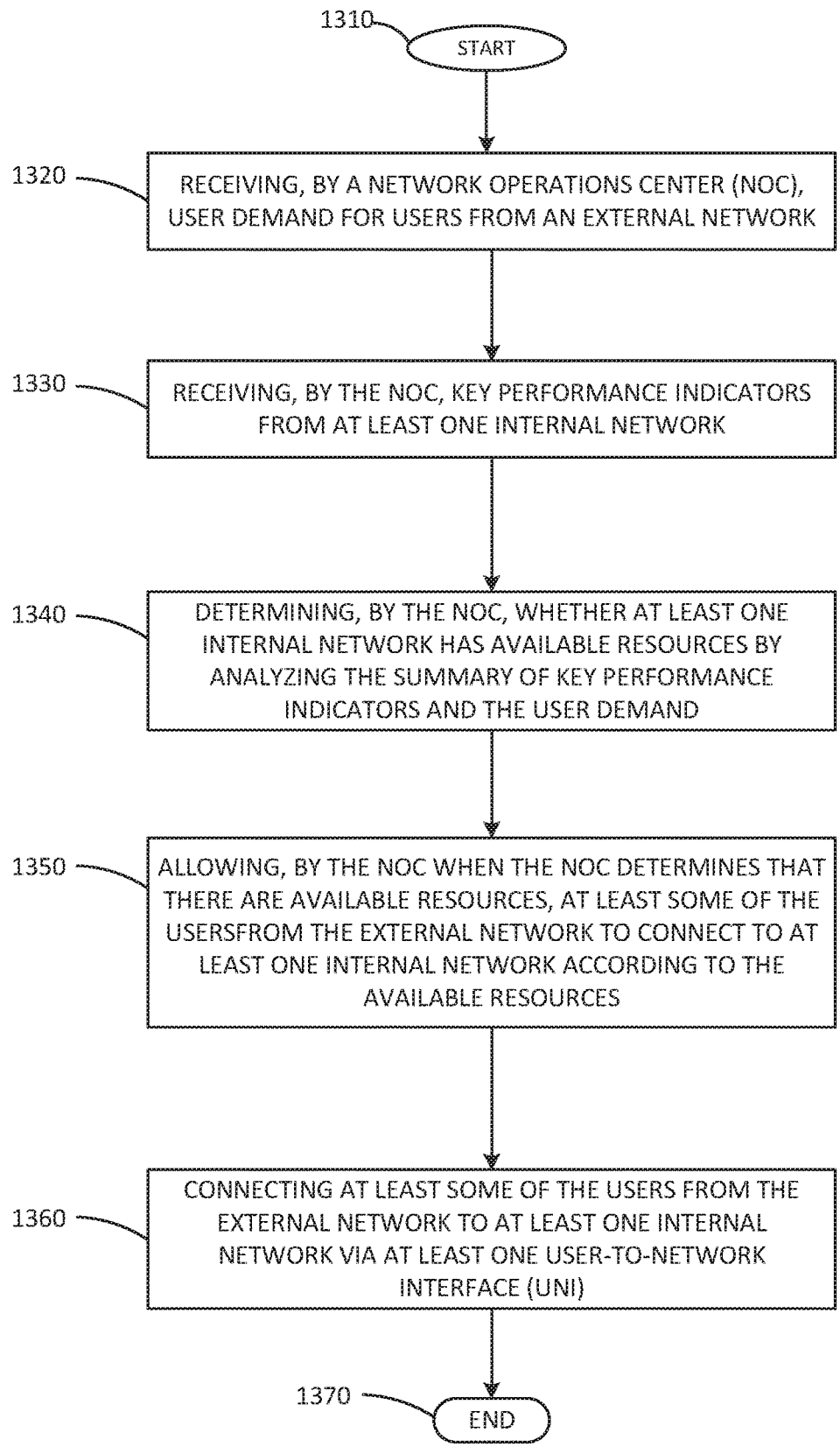

FIG. 13 is a flow chart showing the method for operation of the disclosed system for an adaptive self-optimizing network using closed-loop feedback relating to FIG. 11, in accordance with at least one embodiment of the present disclosure.

Figure 14:
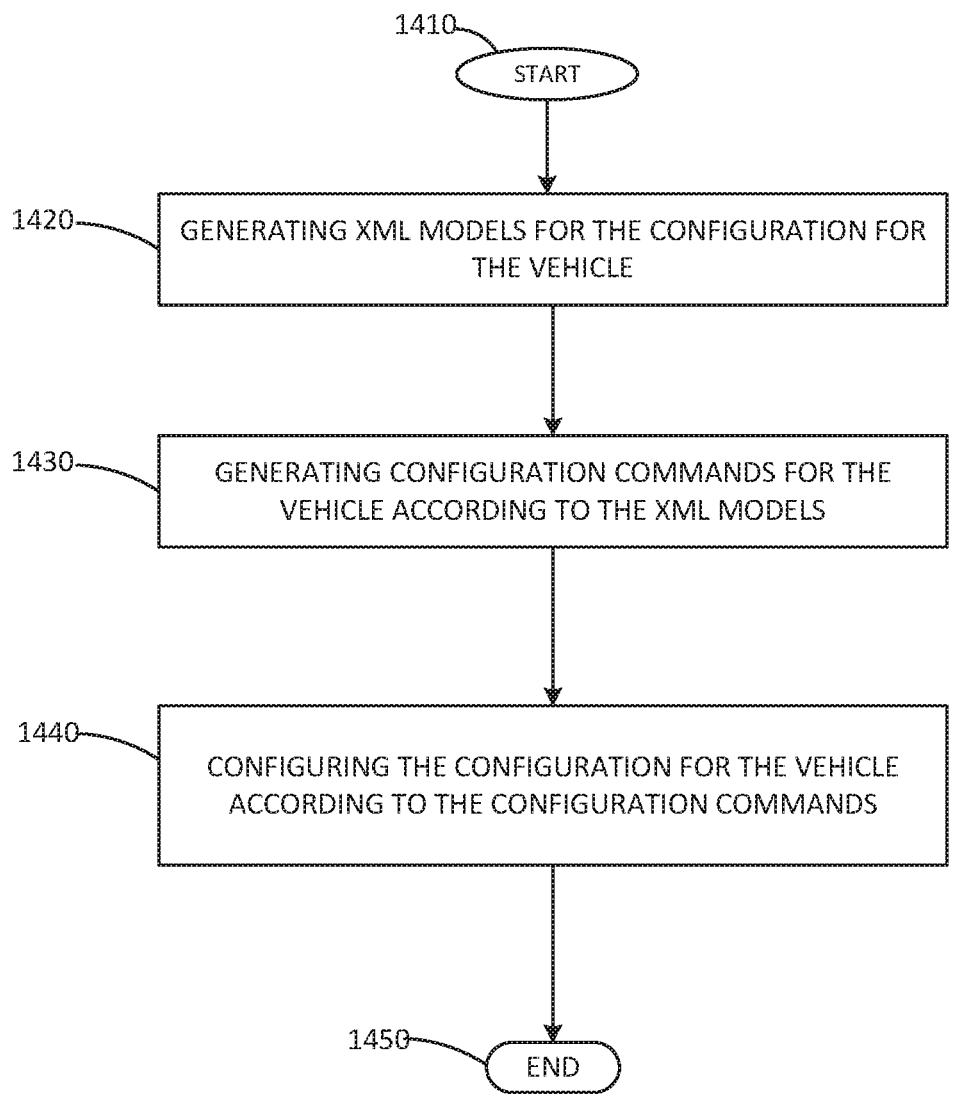

FIG. 14 is a flow chart showing the method for configuring a configuration for a vehicle relating to FIG. 12, in accordance with at least one embodiment of the present disclosure.

DESCRIPTION

The methods and apparatus disclosed herein provide an operative system for an adaptive self-optimizing network using closed-loop feedback. In one or more embodiments, the system of the present disclosure provides adaptive, closed-loop management of a network (e.g., a satellite network) in a manner that allows for the network to dynamically adapt to changing user demand for network resources (e.g., loading patterns), ambient environmental conditions, and/or system performance (e.g., including failures). In particular, the disclosed system allows for management of network resources by using closed-loop feedback of real-time statistics pulled from the system.

Specifically, a distributed microservices-based architecture is employed by the system to disseminate a centralized policy (e.g., a global policy) from a global network operations center (GNOC) to a collection of gateways (GWs) (e.g., ground stations) located throughout the system. Additionally, the system employs a system resource manager (SRM) that provides essential functions for connection management, beam management, carrier management, admission control, routing management, signaling management, and/or automated system configuration. The centralized policy, which is disseminated to the gateways, is derived from key performance indicators (KPIs) pulled from various elements of the system to create a closed-loop, adaptive feedback mechanism.

In addition, standards-based protocols and interfaces are employed for evolvability and interoperability of the network. Extensible markup language (XML) based schemas developed to model the network access node's configuration (e.g., satellite payload configuration) are utilized by the system to allow the network access nodes (e.g., satellites) residing in the network (e.g., constellation) to be managed seamlessly as part of the network via an operations manager. The adaptive nature of the disclosed system allows for the network of network access nodes (e.g., satellite constellation) to behave as a self-organizing and self-optimizing network.

The system of the present disclosure has the following advantageous features. Firstly, the system employs adaptive, closed-loop feedback from the network to dynamically self-optimize performance. Secondly, the system provides tight integration of all of the essential functions required for system resource management of a large nodal network (e.g., satellite network). Thirdly, the system provides a reusable framework architecture that can be applied to a single satellite system, a constellation of satellites (e.g., a geosynchronous earth orbit (GEO) satellite constellation, a low earth orbit (LEO) satellite constellation, a medium earth orbit (MEO) satellite constellation, or a supersynchronous GEO satellite constellation, with no inclination or with inclination), or a hybrid satellite constellation comprising multiple different satellite constellations (e.g., a GEO and MEO satellite constellation, a LEO and MEO satellite constellation, or a GEO and LEO satellite constellation). And, fourthly, the disclosed system has the ability to optimize system policy based on dynamic feedback and generate system configuration commands that can be automatically pushed throughout the network in real time.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to networks, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

In various embodiments, the disclosed system for an adaptive self-optimizing network using closed-loop feedback employs a constellation of satellites. It should be noted that the disclosed system for an adaptive self-optimizing network using closed-loop feedback may be employed for network access nodes (e.g., high-altitude platforms, airborne vehicles, terrestrial vehicles, marine vehicles, and/or fixed terrestrial base stations) other than satellites as disclosed herein. The following discussion is thus directed to satellites without loss of generality.

FIG. 1 is a block diagram 100 showing the management architecture for the disclosed system for an adaptive self-optimizing network using closed-loop feedback, in accordance with at least one embodiment of the present disclosure. In this figure, a network access node constellation 110 comprises a system of interconnected configurable network access nodes 105. In one or more embodiments, the network access nodes 105 may be space vehicles (e.g., satellites, high-altitude platforms (HAPs), such as balloons or high-endurance unmanned aerial vehicles (UAVs)), airborne vehicles (e.g., aircraft or unmanned aerial vehicle (UAVs)), terrestrial vehicles (trucks, tanks, or unmanned ground vehicles (UGVs)), marine vehicles (e.g., ships, submarines, or an unmanned underwater vehicles (UUVs)), and/or fixed terrestrial based stations. In some embodiments, when the network access node constellation 110 is a constellation of satellites, the satellite constellation may be a geosynchronous earth orbit (GEO) satellite constellation (with no inclination or with inclination), a low earth orbit (LEO) satellite constellation (with no inclination or with inclination), a medium earth orbit (MEO) satellite constellation (with no inclination or with inclination), a supersynchronous GEO satellite constellation (with no inclination or with inclination), or a hybrid satellite constellation comprising multiple different satellite constellations (e.g., a GEO and MEO satellite constellation, a LEO and MEO satellite constellation, or a GEO and LEO satellite constellation) (with no inclination or with inclination). It should be noted that when the network access nodes 105 are satellites, the satellites will each have a configurable payload 115.

Also in this figure, a global network operations center (GNOC) is shown to comprise an operation center (xOC) 125 (that is unique to the type of network the network access nodes use), a network operations center (NOC) 130, and a cybersecurity operations center (CSOC) 135. The xOC 125, if one or more of the network access nodes 105 is a satellite, maintains the orbit of the satellite, receives tracking and telemetry (e.g., regarding the satellite's location, configuration, and state of health), transmits commands (e.g., satellite bus and payload configuration commands, and manages antenna pointing). The CSOC 135 manages the security of the system (e.g., by detecting, notifying of, and mitigating cyber attacks). The NOC 130 comprises a system resource manager (SRM) 140 that manages the resources of the network of network access nodes.

Also in FIG. 1, at least one distributed network gateway (GW) 145 is shown. Each of the at least one distributed network GW 145 is associated with at least one of the network access nodes 105, and each of the network access nodes 105 is associated with the at least one distributed network GW 145. Each of the at least one distributed network GW 145 is shown to comprise an SRM 150 for GW monitoring and control (M&C) 155. In addition, each of the at least one distributed network GW 145 comprises an antenna farm (e.g., a plurality of transmit and receive antennas) 160, radio frequency equipment (RFE) and switching 165, MODEMs (modulator/demodulator) and optionally a ground-based beamforming (GBBF) network 170, and network architecture/infrastructure 175 (e.g., switches, routers, firewalls, etc.). The GW M&C 155 performs monitoring and control of the state of health of the antennas and RFE, network infrastructure, and/or control of the feederlink antennas of the antenna farm. Each of the at least one distributed network GW 145 is in communication (via fiber (wire) and/or wirelessly (via satellite)) with the GNOC 120 and may also be in communication (via fiber (wire) and/or wirelessly (via satellite, e.g., by feeder-link)) with its collection of the network access nodes 105 attached.

In addition, the disclosed system may comprise a regional NOC (RNOC) 180, as is shown in FIG. 1. The RNOC 180 comprises a SRM 185. The RNOC 180 is in communication (via fiber (wire) and/or wirelessly (via satellite)) with the GNOC 120 and/or is in communication (via fiber (wire) and/or wirelessly (via satellite)) with the at least one distributed network GW 145.

The GNOC 120 and RNOC 180 may each be co-located with (or within) a distributed network GW. As such, the GNOC 120 and the RNOC 180 may also comprise the same units (e.g., the antenna farm 160, RFE and switching 165, MODEMs and optional GBBF 170, and network architecture/infrastructure 175) as the at least one distributed network GW 145 as depicted in FIG. 1. As such, the SRM 140 of the GNOC 120 and the SRM 150 of the RNOC may perform GW M&C 155 by monitoring and control of the state of health of the antennas and RFE, network infrastructure, and/or control of the feederlink antennas of the antenna farm.

During operation of the disclosed system, the SRM 140 of the GNOC 120 receives operator inputs 190 from operators (e.g., refer to 410 of FIG. 4). The operator inputs 190 may comprise frequency spectrum planning, traffic planning, and/or contingency plans. The SRM 140 of the GNOC 120 generates a (initial) global policy 191 according to the parameters of the operator inputs 190. The global policy 191 may comprise beam allocations (e.g., the size, shape, location, and power of the antenna beams), capacity allocations (e.g., the location of terminals (users) and user demands), software-defined network (SDN) management (e.g., the routing and signaling policy), and/or admission control policy (e.g., connection admission control (CAC) policy, which dictates the adding or removing of terminals (users)).

After the SRM 140 generates the global policy 191, the SRM 140 of the GNOC 120 and/or an SRM 150 of the at least one distributed network GW 145 generates configuration commands 192 for configurations for the configurable payload 115 of at least one of the network access nodes 105 in the network access node constellation 110 based on the global policy 191.

It should be noted that in some embodiments, alternatively, an operations manager (refer to 420 of FIG. 5) may generate XML models (refer to 520a, 520b, 520c, 520d, 520n of FIG. 5) for configurations for the configurable payload 115 in accordance with the defined global policy 191. For these embodiments, an XML-based configuration data translator (refer to 510 of FIG. 5) translates the XML models 520a, 520b, 520c, 520d, 520n into flight software commands to generate the configuration commands 192. The description of FIG. 5 discusses the details of the use of XML models 520a, 520b, 520c, 520d, 520n to generate the configuration commands 192. It should be noted that the operations manager 420 and the XML-based configuration data translator 510 may be located within the GNOC 120, the RNOC 180, and/or at the least one distributed network GW 145. In particular, the operations manager 420 and the XML-based configuration data translator 510 may be located within the SRM 140 of the GNOC 120, the SRM 185 of the RNOC 180, and/or the SRM 150 of the at least one distributed network GW 145.

After the configuration commands 192 have been generated, the xOC 125 of the GNOC 120, the RNOC 180, and/or the at least one distributed network GW 145 transmits the configuration commands (CMD) 192 to at least one of the network access nodes 105 to configure the configurable payload 115 of the at least one of the network access nodes 105 accordingly. After the at least one of the network access nodes 105 receives the configuration commands 192, the configuration commands 192 command the configurable payload 115 of the at least one of the network access nodes 105 to configure the configurable payload 115 according to the configuration(s) contained within the configuration commands 192.

After the configurable payload 115 of the at least one of the network access nodes 105 has configured according to the configuration commands 192, the at least one of the network access nodes 105 will transmit telemetry (TLM) (e.g., comprising the configurable payload 115 configuration, monitoring information, and the state of health of the network access nodes 105) 193 to the xOC 125 of the GNOC 120, the RNOC 180, and/or the at least one distributed network GW 145.

Then, the at least one distributed network GW 145 and/or the RNOC 180 will transmit a summary of key performance indicators (KPIs) 194, which are obtained from at least one of the network access nodes 105 to the GNOC 120. The summary of KPIs 194 may comprise subscriber demand, MODEM power profiles, beam and carrier (beam/carrier) utilization, session blocking rates, random access channel (RACH) success rates (e.g., the success rates of the RACH procedure used to allow user terminals to discover and negotiate access to the system), bearer success rates (e.g., the success rates of bearer requests), session setup latency (e.g., length of time to establish a link), and/or handover success rate (e.g., the success rates for beam-to-beam, inter-network access node (e.g., satellite-to-satellite), inter-gateways (e.g., GW-to-GW), and/or inter-network (e.g., internal-to-internal network or external-to-external network, also referred to as roaming) handover).

In some embodiments, optionally, the RNOC 180 will generate a regional policy 195. The regional policy 195 may comprise admission control, mobility management, channel allocations, carrier allocations, bearer allocations, power management, and/or forward and/or return (FWD/RTN) scheduling (e.g., downlink/uplink scheduling for user terminals). For these embodiments, the RNOC 180 will transmit the regional policy 195 to the GNOC 120, either directly or via the at least one distributed network GW 145.

After the GNOC 120 has received the summary of KPIs 194, the GNOC 120 may revise (update) the global policy 191 according to the summary of KPIs 194 and, if necessary, according to the regional policy 195, in order to dynamically adapt resource allocations to changes in the aggregate subscriber demand.

After the GNOC 120 has revised the global policy 191, the operation of the system repeats the steps following the GNOC 120 initially generating the global policy 191. As such, the network of the network access nodes 105 is self-optimizing by using closed-loop feedback of KPIs 194 (and optionally the regional policy 195) provided by the at least one distributed network GW 145 and/or the RNOC 180.

Figure 2:
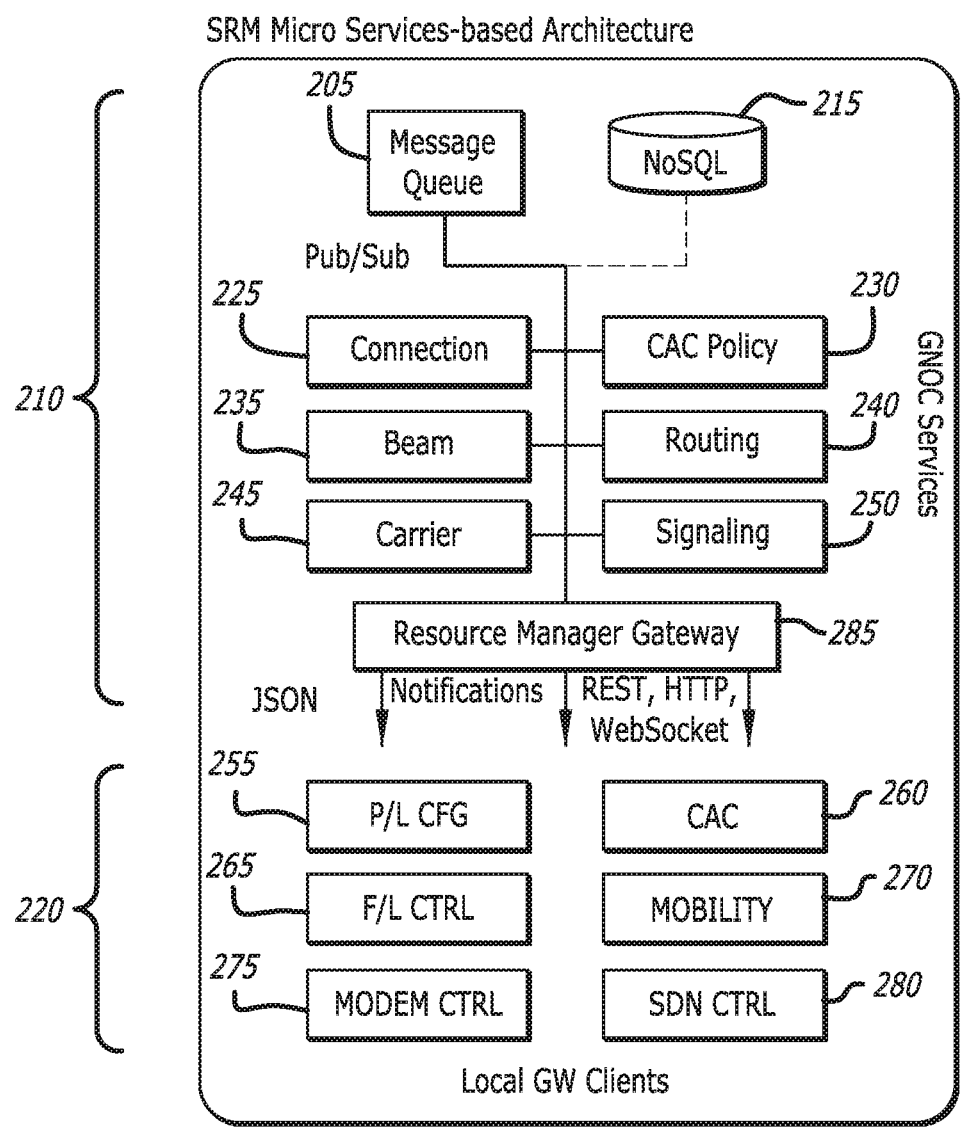
FIG. 2 is a block diagram showing the distributed functional architecture for the disclosed system for an adaptive self-optimizing network using closed-loop feedback, in accordance with at least one embodiment of the present disclosure.

FIG. 2 is a block diagram 200 showing the distributed functional architecture for the disclosed system for an adaptive self-optimizing network using closed-loop feedback, in accordance with at least one embodiment of the present disclosure. In this figure, GNOC functions 210 and distributed network GW functions 220 are illustrated. The GNOC functions 210 are functions of the GNOC 120 (refer to FIG. 1), and the distributed network GW functions 220 are functions of the at least one distributed network GW 145 (refer to FIG. 1) and/or the RNOC 180 (refer to FIG. 1). As shown in this figure, the GNOC functions 210 comprise a message queue 205 and a non-structured query language (NoSQL) database 215. In addition, the GNOC functions 210 comprise connection management 225 (e.g., for establishing connections from a user terminal to the network access nodes 105 within view of the user terminal and to the at least one distributed network GW 145 through the network access nodes 105), beam management 235 (e.g., controlling the beamformer, which is physically located either within the network access nodes 105 or within the at least one distributed network GW 145), and carrier management 245 (e.g., controlling the MODEM carriers within a beam). The GNOC functions 210 also comprise a connection admission control (CAC) policy 230 (e.g., a network configuration policy (e.g., the global policy 191) generated based on user demand and available resources), routing management 240 (e.g., controlling the routing of the signal traffic through the network), and signaling management 250 (e.g., setting up sessions for the routing).

Also in this figure, a resource manager gateway 285 allows for the GNOC 120 to communicate with the at least one distributed network GW 145 (or the RNOC 180) via JavaScript Object Notification (JSON) and/or standard web-based interfaces (e.g., represented state transfer (REST), hypertext transfer protocol (HTTP), and/or websocket).

As shown in this figure, the distributed network GW functions 220 comprise payload configuration (P/L CFG) 255 (e.g., for configuration of the payload), forward link control (F/L CTRL) 265 (e.g., for controlling the link between the network access nodes 105 and the at least one distributed network GW 145 (or the RNOC 180)), MODEM control 275 (e.g., controlling the MODEM, which creates the carriers), connection admission control (CAC) 260 (e.g., controlling the adding or removing of user terminals based on the CAC policy 230 (e.g., global policy 191)), mobility 270 (e.g., controlling the handover of network access nodes as they move and/or of user terminals as they move), and software-defined network (SDN) control 280 (e.g., the routing of signals according to the CAC policy 230).

FIGS. 3A and 3B together form a flow chart showing the method for operation of the disclosed system for an adaptive self-optimizing network using closed-loop feedback relating to FIG. 1, in accordance with at least one embodiment of the present disclosure. At the start 310 of the method, a global network operations center (GNOC) receives operator inputs 320. Then, the GNOC generates a global policy according to the operator inputs 330.

The GNOC and/or a distributed network gateway (GW) generate configuration commands for configurations for at least one of the network access nodes based on the global policy. Then, the GNOC and/or the distributed network GW transmit the configuration commands to at least one of the network access nodes 350. At least one of the network access nodes then transmits telemetry to the GNOC and/or the distributed network GW 360.

Then, a distributed network GW transmits a summary of key performance indicators (KPIs) to the GNOC 370. Optionally, a regional network operations center (RNOC) generates a regional policy 380. The GNOC then revises the global policy according to the summary of key performance indicators and, if necessary, according to the regional policy 390. Then, the method repeats itself by proceeding back to step 340.

FIG. 4 is a diagram 400 showing the top level architecture for the disclosed system for an adaptive self-optimizing network using closed-loop feedback, in accordance with at least one embodiment of the present disclosure. In this figure, a network operations center (NOC) 430 is shown. The NOC 430 may be a GNOC 120 or a RNOC 180, and may be co-located within a distributed network GW. The NOC 430 is shown to comprise an operational support system/business support system (OSS/BSS) 425 and the operations manager 420. The operations manager 420 comprises an application programming interface (API) handler 435, a database 440, a SRM policy enforcement module 445, a lifecycle services orchestration (LSO) manager 450, and a service and configuration registry 455. The operations manager 420 further comprises an operator interface (I/F) 490 that is used to provide situational awareness to the NOC 430 and the operations manager 420 access to operators residing within the NOC 430. In addition, the operations manager 420 may operate within the context of a commercial operating system, such as LINUX 460.

The NOC 430 also comprises a software-defined network (SDN) controller 465, which communicates with the operations manager 420 by using a standard network management system-software-defined network controller (NMS-SDNC) application program interface (API).

Also shown in this figure are an external network 471 and internal networks 470a, 470b. It should be noted that the system may comprise more or less than two internal networks 470a, 470b, and/or more than one external network 471 as is shown in this figure. The NOC 430 controls operations of the internal networks 470a, 470b, and the external network 471 is controlled by a different entity.

The external network (Domain B (Peer)) 471 is shown to comprise a network operating system (NOS) 480 and two routers 475a, 475b. In practice, the external network 471 domain may employ alternative architectures than as shown. The NOS 480 and the two routers 475a, 475b are all in communication with each other within the external network 471. Users 479 associated with the external network 471 are connected to the external network 471 via a user-to-network interface (UNI) 486d.

The internal network (Domain $A_1$) 470a is shown to comprise a backbone core bridge (BCB) 481, a virtual network function (VNF) 476, at least one of the network access nodes (e.g., satellite) 105, a provider backbone bridging-traffic engineering (PBB-TE) 477, and two backbone edge bridges (BEBs) 482a, 482b. In practice, the internal network 470a domain may employ alternative architectures than as shown. The BCB 481, VNF 476, the at least one of the network access nodes 105, PBB-TE 477, and BEBs 482a, 482b are all in communication with each other within the internal network 470a.

The internal network (Domain $A_2$) 470b is shown to comprise three open virtual switches (OVSs) 483a, 483b, 483c. In practice, the internal network 470b domain may employ alternative architectures than as shown. The OVSs 483a, 483b, 483c are all in communication with each other within the internal network 470b. Users 478 associated with the internal networks 470a, 470b are connected to the internal networks 470a, 470b via user-to-network interfaces (UNIs) 486a, 486b.

The external network 471 is connected to internal network 470a and to internal network 470b via external network-to-network interfaces (ENNIs) 484a, 484b, 484c. Internal network 470a is connected to internal network 470b via internal network-to-network interfaces (INNIs) 485a, 485b.

It should be noted that the external network 471 and internal networks 470a, 470b may each comprise various different components in various different combinations than as shown in FIG. 4. In particular, the external network 471 and the internal networks 470a, 470b may each comprise at least one of the network access nodes 105, a router 475, a network operating system (NOS) 480, an open virtual switch (OVS) 483, a backbone edge bridge (BEB) 482, a backbone core bridge (BCB) 481, a virtual network function (VNF) 476, and/or provider backbone bridging-traffic engineering (PBB-TE) 477. The at least one of the network access nodes 105 may be a space vehicle, a high-altitude platform, an airborne vehicle, a terrestrial vehicle, or a marine vehicle. In some embodiments, the space vehicle is a satellite, and the satellite is a geosynchronous earth orbit (GEO) satellite, a low earth orbit (LEO) satellite, a medium earth orbit (MEO) satellite, or a supersynchronous GEO satellite.

During operation of the disclosed system, the operations manager 420 of the NOC 430 receives a user demand from the external network 470. The access requests with user demand, which specifies a desired amount of resources (e.g., bandwidth, etc.) from the internal networks 470a, 470b to be used by (shared with) users 479 associated with the external network 471. The operations manager 420 of the NOC 430 also receives a summary of KPIs from at least one of the internal networks 470a, 470b.

After the operations manager 420 of the NOC 430 receives the user demand and the summary of KPIs, the operations manager 420 of the NOC 430 analyzes the user demand from the access requests and the summary of KPIs to determine whether at least one of the internal networks 470a, 470b has available resources that can be shared with the users 479, while maintaining enforcement of pre-existing service contracts with existing users. When the operations manager 420 of the NOC 430 determines that at least one of the internal networks 470a, 470b has available resources, the operations manager 420 of the NOC 430 will notify the SDN controller 465 of the NOC 430 to allow the users 479 associated with the external network 471 to connect to the internal networks 470a, 470b according to the available resources. The SDN controller 465 of the NOC 430 will then allow a specific number of users 479 to connect to the internal networks 470a, 470b according to the amount of available resources. Then, the users 479 that are allowed to connect to the internal networks 470a, 470b will proceed to connect to the internal networks 470a, 470b via UNI 486c.

It should be noted that the SDN controller 465 of the NOC 430 controls connections (switching) of the ENNIs 484, the INNIs 485, and the UNIs 486 of the system, in addition to intra-domain connectivity.

FIG. 5 is a diagram 500 showing further details of the operations manager 420 of FIG. 4, in accordance with at least one embodiment of the present disclosure. In this figure, the operations manager 420 is shown to comprise the database (e.g., system configuration database) 440 (refer to FIG. 4) and further comprise an XML-based configuration data translator 510. The database 440 comprises a startup configuration (Cfg) database 515, a running configuration database 525, and a candidate configuration database 535. The database 440 receives policy management information, network topology information, service management information, and network state of health and performance information to be stored within its databases 515, 525, 535.

During operation of the disclosed system, the operations manager 420 generates XML models 520a, 520b, 520c, 520d, 520n for configurations for units (e.g., switches 530a, routers 530b, MODEMs 530c, and other devices 530d) for the configurable payload 115 (refer to FIG. 1) according to the global policy 191 (refer to FIG. 1). After the XML models 520a, 520b, 520c, 520d, 520n have been generated, the XML-based configuration data translator 510 operates as a payload configurator 540, which is a translator to translate the XML models 520a, 520b, 520c, 520d, 520n into proprietary flight software commands to be used as the configuration commands 192 (refer to FIG. 1).

FIG. 6 is a flow chart showing the method for operation of the disclosed system for an adaptive self-optimizing network using closed-loop feedback relating to FIG. 4, in accordance with at least one embodiment of the present disclosure. At the start 610 of the method, a network operations center (NOC) receives access requests for users subscribed to an external network 620. Then, the NOC receives a summary of key performance indicators (KPIs) from at least one internal network 630. The NOC then determines whether at least one internal network has available resources by analyzing the summary of key performance parameters and the user demand 640. When the NOC determines that there are available resources (while maintaining enforcement of pre-existing service contracts with existing users), the NOC allows at least some of the users from the external network to connect to at last one internal network to the available resources 650. Then, at least some of the users from the external network connect to at least one internal network via at least one user-to-network interface (UNI) 660. Then, the method ends 670.

FIG. 7 is a flow chart showing the method for configuring a configuration for a network access node relating to FIG. 5, in accordance with at least one embodiment of the present disclosure. At the start 710 of the method, XML models are generated for the configuration for the network access node 720. Then, configuration commands are generated for the network access node according to XML models 730. The configuration of the network access node is then configured according to the configuration commands 740. Then, the method ends 750.

In addition, the methods and apparatus disclosed herein provide an operative system for an adaptive self-optimizing network using closed-loop feedback. In one or more embodiments, the system of the present disclosure provides adaptive, closed-loop management of a satellite network in a manner that allows for the network to dynamically adapt to changing user demand for satellite resources (e.g., loading patterns), ambient environmental conditions, and/or system performance (e.g., including failures). In particular, the disclosed system allows for management of satellite resources by using closed-loop feedback of real-time statistics pulled from the system.

Specifically, a distributed microservices-based architecture is employed by the system to disseminate a centralized policy (e.g., a global policy) from a global network operations center (GNOC) to a collection of ground stations (e.g., ground gateways (GWs)) located throughout the system. Additionally, the system employs a system resource manager (SRM) that provides essential functions for connection management, beam management, carrier management, admission control, routing management, signaling management, and/or automated system configuration. The centralized policy, which is disseminated to the ground stations, is derived from key performance indicators (KPIs) pulled from various elements of the system to create a closed-loop, adaptive feedback mechanism.

Further, standards-based protocols and interfaces are employed for evolvability and interoperability of the network. Extensible markup language (XML) based schemas developed to model the satellite payload are utilized by the system to allow the satellite payloads residing in the constellation to be managed seamlessly as part of the network via an operations manager. The adaptive nature of the disclosed system allows for the satellite constellation to behave as a self-organizing and self-optimizing network.

The system of the present disclosure has the following advantageous features. Firstly, the system employs adaptive, closed-loop feedback from the network to dynamically self-optimize performance. Secondly, the system provides tight integration of all of the essential functions required for system resource management of a large satellite network. Thirdly, the system provides a reusable framework architecture that can be applied to a single satellite system, a constellation of satellites (e.g., a geosynchronous earth orbit (GEO) satellite constellation, a low earth orbit (LEO) satellite constellation, a medium earth orbit (MEO) satellite constellation, or a super GEO satellite constellation, with no inclination or with inclination), or a hybrid satellite constellation comprising multiple different satellite constellations (e.g., a GEO and MEO satellite constellation, a LEO and MEO satellite constellation, or a GEO and LEO satellite constellation). And, fourthly, the disclosed system has the ability to optimize system policy based on dynamic feedback and generate system configuration commands that can be automatically pushed throughout the network in real time.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to networks, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

In various embodiments, the disclosed system for an adaptive self-optimizing network using closed-loop feedback employs a constellation of satellites. It should be noted that the disclosed system for an adaptive self-optimizing network using closed-loop feedback may be employed for other vehicles (e.g., airborne vehicles, terrestrial vehicles, and marine vehicles) other than satellites as disclosed herein. The following discussion is thus directed to satellites without loss of generality.

FIG. 8 is a block diagram 800 showing the management architecture for the disclosed system for an adaptive self-optimizing network using closed-loop feedback, in accordance with at least one embodiment of the present disclosure. In this figure, a vehicle constellation 810 comprises a network of configurable vehicles 805. In one or more embodiments, the vehicles 805 may be space vehicles (e.g., satellites), airborne vehicles (e.g., an aircraft or an unmanned aerial vehicles (UAVs)), terrestrial vehicles (trucks, tanks, or unmanned ground vehicles (UGVs)), and/or marine vehicles (e.g., ships, submarines, or an unmanned underwater vehicles (UUVs)). In some embodiments, when the vehicle constellation 810 is a constellation of satellites, the satellite constellation may be a geosynchronous earth orbit (GEO) satellite constellation (with no inclination or with inclination), a low earth orbit (LEO) satellite constellation (with no inclination or with inclination), a medium earth orbit (MEO) satellite constellation (with no inclination or with inclination), a super GEO satellite constellation (with no inclination or with inclination), or a hybrid satellite constellation comprising multiple different satellite constellations (e.g., a GEO and MEO satellite constellation, a LEO and MEO satellite constellation, or a GEO and LEO satellite constellation) (with no inclination or with inclination). It should be noted that when the vehicles 805 are satellites, the satellites will each have a configurable payload 815.

Also in this figure, a global network operations center (GNOC) is shown to comprise a vehicle operation center (VOC) 825, a network operations center (NOC) 830, and a cybersecurity operations center (CSOC) 835. The VOC 825, if one of the vehicles 805 is a satellite, maintains the orbit of the satellite, receives telemetry (e.g., regarding the vehicle's payload configuration and state of health), transmits commands (e.g., payload configuration commands, and manages antenna pointing. The CSOC 835 manages the security of the system (e.g., by detecting, notifying of, and mitigating cyber attacks). The NOC 830 comprises a system resource manager (SRM) 840 that manages the resources of the network of vehicles.

Also in FIG. 8, at least one local gateway (GW) 845 is shown. Each of the at least one local GW 845 is associated with at least one of the vehicles 805, and each of the vehicles 805 is associated with the at least one local GW 845. Each of the at least one local GW 845 is shown to comprise a SRM 850 for GW monitoring and control (M&C) 855. In addition, each of the at least one local GW 845 comprises an antenna farm (e.g., a plurality of transmit and receive antennas) 860, radio frequency equipment (RFE) and switching 865, MODEMs (modulator/demodulator) and optionally a ground-based beamformer (GBBF) 870, and network architecture/infrastructure 875 (e.g., switches, routers, firewalls, etc.). The GW M&C 855 performs monitoring of the state of health of the antennas and RFE, switching of the network switches, and/or gimballing of the antennas of the antenna farm. Each of the at least one local GW 845 is in communication (via wire and/or wirelessly) with the GNOC 820 and may also be in communication (via wire and/or wirelessly, e.g., by feeder-link) with its associated one of the vehicles 805.

In addition, the disclosed system may comprise a regional NOC (RNOC) 880, as is shown in FIG. 8. The RNOC 880 comprises a SRM 885. The RNOC 880 is in communication (via wire and/or wirelessly) with the GNOC 820 and/or is in communication (via wire and/or wirelessly) with the at least one local GW 845.

The GNOC 820 and RNOC 880 may each be located within a GW. As such, the GNOC 820 and the RNOC 880 may also comprise the same units (e.g., the antenna farm 860, RFE and switching 865, MODEMs and optional GBBF 870, and network architecture/infrastructure 875) as the at least one local GW 845 as depicted in FIG. 8. As such, the SRM 840 of the GNOC 820 and the SRM 850 of the RNOC may perform GW M&C 855 by monitoring of the state of health of the antennas and RFE, switching of the network switches, and gimballing of the antennas of the antenna farm.

During operation of the disclosed system, the SRM 840 of the GNOC 820 receives operator inputs 890 from operators (e.g., refer to 1110 of FIG. 11). The operator inputs 890 may comprise frequency spectrum planning, traffic planning, and/or contingency plans. The SRM 840 of the GNOC 820 generates a (initial) global policy 891 according to the parameters of the operator inputs 890. The global policy 891 may comprise beam allocations (e.g., the size, shape, location, and power of the antenna beams), capacity allocations (e.g., the location of terminals (users) and user demands), software-defined network (SDN) management (e.g., the routing and signaling policy), and/or admission control policy (e.g. connection admission control (CAC) policy, which dictates the adding or removing of terminals (users)).

After the SRM 840 generates the global policy 891, the SRM 840 of the GNOC 820 and/or an SRM 850 of the at least one local GW 845 generates configuration commands 892 for configurations for the configurable payload 815 of at least one of the vehicles 805 in the vehicle constellation 810 based on the global policy 891.

It should be noted that in some embodiments, alternatively, an operations manager (refer 1120 of FIG. 12) may generate XML models (refer to 1220a, 1220b, 1220c, 1220d, 1220n of FIG. 12) for configurations for the configurable payload 815 according to the global policy 891. For these embodiments, an XML-based configuration data translator (refer to 1210 of FIG. 12) translates the XML models 1220a, 1220b, 1220c, 1220d, 1220n into flight software commands to generate the configuration commands 892. The description of FIG. 12 discusses the details of the use of XML models 1220a, 1220b, 1220c, 1220d, 1220n to generate the configuration commands 892. It should be noted that the operations manager 1120 and the XML-based configuration data translator 1210 may be located within the GNOC 820, the RNOC 880, and/or the at least one local GW 845. In particular, the operations manager 1120 and the XML-based configuration data translator 1210 may be located within the SRM 840 of the GNOC 820, the SRM 885 of the RNOC 880, and/or the SRM 850 of the at least one local GW 845.

After the configuration commands 892 have been generated, the VOC 825 of the GNOC 820, the RNOC 880, and/or the at least one local GW 845 transmits the configuration commands (CMD) 892 to at least one of the vehicles 805 to configure the configurable payload 815 of the at least one of the vehicles 805 accordingly. After the at least one of the vehicles 805 receives the configuration commands 892, the configuration commands 892 command the configurable payload 815 of the at least one of the vehicles 805 to configure according to the configuration(s) contained within the configuration commands 892.

After the configurable payload 815 of the at least one of the vehicles 805 has configured according to the configuration commands 892, the at least one of the vehicles 805 will transmit telemetry (TLM) (e.g., comprising the configurable payload 815 configuration and the state of health of the at least one of the vehicles 805) 893 to the VOC 825 of the GNOC 820, the RNOC 880, and/or the at least one local GW 845.

Then, the at least one local GW 845 and/or the RNOC 880 will transmit key performance indicators (KPIs) 894, which are obtained from the at least one of the vehicles (e.g., point of presence (POP)) 805 to the GNOC 820. The KPIs 894 may comprise subscriber demand, MODEM power profiles, beam/carrier utilization, session blocking rates, remote access channel (RACH) success rates (e.g., the success rates of the RACH procedure for handshaking onto the system), bearer success rates (e.g., the success rates of bearer requests), session setup latency (e.g., length of time to establish a link), and/or handover success rates (e.g. the success rates for beam-to-beam, vehicle-to-vehicle, and/or user terminal-to-user terminal handover).

In some embodiments, optionally, the RNOC 880 will generate a regional policy 895. The regional policy 895 may comprise admission control, mobility management, channel allocations, carrier allocations, bearer allocations, power management, and/or forward/return (FWD/RTN) scheduling (e.g., downlink/uplink scheduling for user terminals). For these embodiments, the RNOC 880 will transmit the regional policy 895 to the GNOC 820, either directly or via the at least one local GW 845.

After the GNOC 820 has received the KPIs 894, the GNOC 820 will revise the global policy 891 according to the KPIs 894 and, optionally, according to the regional policy 895.

After the GNOC 820 has revised the global policy 891, the operation of the system repeats the steps following the GNOC 820 initially generating the global policy 891. As such, the network of the vehicles 805 is self-optimizing by using closed-loop feedback of KPIs 894 (and optionally the regional policy 895) provided by the at least one local GW 845 and/or the RNOC 880.

FIG. 9 is a block diagram 900 showing the distributed functional architecture for the disclosed system for an adaptive self-optimizing network using closed-loop feedback, in accordance with at least one embodiment of the present disclosure. In this figure, GNOC functions 910 and GW functions 920 are illustrated. The GNOC functions 910 are functions of the GNOC 820 (refer to FIG. 8), and the GW functions 920 are functions of the at least one local GW 845 (refer to FIG. 8) and/or the RNOC 880 (refer to FIG. 8). As shown in this figure, the GNOC functions 910 comprise a message queue 905 and a non-structured query language (No SQL) database 915. In addition, the GNOC functions 910 comprise connection management 925 (e.g., for establishing connections from a user terminal to one of the vehicles 805 within view of the user terminal and to the at least one local GW 845 through the one of the vehicles 805), beam management 935 (e.g., controlling the beamformer, which is located within the one of the vehicles 805 or the at least one local GW 845), and carrier management 945 (e.g., controlling the carriers within a beam). The GNOC functions 910 also comprise a connection admission control (CAC) policy 930 (e.g., a network configuration policy (e.g., the global policy 891) generated based on user demand and available resources), routing management 940 (e.g., controlling the routing of the signal traffic through the network), and signaling management 950 (e.g., setting up sessions for the routing).

Also in this figure, a resource manager gateway 985 allows for the GNOC 820 to communicate with the at least one local GW 845 (or the RNOC 880) via JavaScript Object Notification (JSON) and/or standard web-based interfaces (e.g., represented state transfer (REST), hypertext transfer protocol (HTTP), and/or websocket).

As shown in this figure, the GW functions 920 comprise payload configuration (P/L CFG) 955 (e.g., for configuration of the payload), forward link control (F/L CTRL) 965 (e.g., for controlling the link between the vehicle and the at least one local GW 845 (or the RNOC 880)), MODEM control 975 (e.g., controlling the MODEM, which creates the carriers), connection admission control (CAC) 960 (e.g., controlling the adding or removing of user terminals based on the CAC policy 930 (e.g., global policy 891)), mobility 970 (e.g., controlling the handover of vehicles as they move and/or of user terminals as they move), and software-defined network (SDN) control 980 (e.g., the routing of signals according to the CAC policy 930).

FIGS. 10A and 10B together form a flow chart showing the method for operation of the disclosed system for an adaptive self-optimizing network using closed-loop feedback relating to FIG. 8, in accordance with at least one embodiment of the present disclosure. At the start 1010 of the method, a global network operations center (GNOC) receives operator inputs, at step 1020. Then, the GNOC generates a global policy according to the operator inputs, at step 1030.

The GNOC and/or a local gateway (GW) generate configuration commands for configurations for at least one of the vehicles based on the global policy, at step 1040. Then, the GNOC and/or the local GW transmit the configuration commands to at least one of the vehicles, at step 1050. At least one of the vehicles then transmits telemetry to the GNOC and/or the local GW, at step 1060.

Then, a local GW transmits key performance indicators (KPIs) to the GNOC, at step 1070. Optionally, a regional network operations center (RNOC) generates a regional policy, at step 1080. The GNOC then revises the global policy according to the key performance indicators and, optionally, according to the regional policy, at step 1090. Then, the method repeats itself by proceeding back to step 1040.

FIG. 11 is a diagram 1100 showing the top level architecture for the disclosed system for an adaptive self-optimizing network using closed-loop feedback, in accordance with at least one embodiment of the present disclosure. In this figure, a network operation center (NOC) 1130 is shown. The NOC 1130 may be a GNOC 820 or a RNOC 880, and may be located within a GW. The NOC 1130 is shown to comprise an operational support system/business support system (OSS/BSS) 1125 and the operations manager 1120. The operations manager 1120 comprises an application programming interface (API) handler 1135, a database 1140, a SRM policy enforcement module 1145, a TOSCA-based LSO application 1150, and a service and configuration registry 1155. The operations manager 1120 further comprises an operator interface (I/F) 1190 that may be used by an operator 1110 to interface with the operations manager 1120. In addition, the operations manager 1120 may operate utilizing LINUX 1160.

The NOC 1130 also comprises a software-defined network (SDN) controller 1165, which communicates with the operations manager 1120 by using a standard network management system-software defined network controller (NMS-SDNC) application program interface (API).

Also shown in this figure are an external network 1171 and internal networks 1170a, 1170b. It should be noted that the system may comprise more or less than two internal networks 1170a, 1170b as is shown in this figure. The NOC 1130 controls operations of the internal networks 1170a, 1170b, and the external network 1171 is controlled by a different entity.

The external network (Domain B (Peer)) 1171 is shown to comprise a network operating system (NOS) 1180 and two routers 1175a, 1175b. The NOS 1180 and the two routers 1175a, 1175b are all in communication with each other within the external network 1171. Users 1177b associated with the external network 1171 are connected to the external network 1171 via a user-to-network interface (UNI) 1186d.

The internal network (Domain $A_1$) 1170a is shown to comprise a backbone core bridge (BCB) 1181, a virtual network function (VNF) 1176, a vehicle (e.g., satellite) from the vehicles 805, a provider backbone bridging-traffic engineering (PBB-TE) 1177, and two backbone edge bridges (BEBs) 1182a, 1182b. The BCB 1181, VNF 1176, a vehicle from the vehicles 805, PBB-TE 1177, and BEBs 1182a, 1182b are all in communication with each other within the internal network 1170a.

The internal network (Domain $A_2$) 1170b is shown to comprise three open virtual switches (OVSs) 1183a, 1183b, 1183c. The OVSs 1183a, 1183b, 1183c are all in communication with each other within the internal network 1170b. Users 1178 associated with the internal networks 1170a, 1170b are connected to the internal networks 1170a, 1170b via user-to-network interfaces (UNIs) 1186a, 1186b.

The external network 1171 is connected to internal network 1170a and to internal network 1170b via external network-to-network interfaces (ENNIs) 1184a, 1184b, 1184c. Internal network 1170a is connected to internal network 1170b via internal network-to-network interfaces (INNIs) 1185a, 1185b.

It should be noted that the external network 1171 and internal networks 1170a, 1170b may each comprise various different components in various different combinations than as shown in FIG. 11. In particular, the external network 1171 and the internal networks 1170a, 1170b may each comprise at least one of the vehicles 805, a router 1175, a network operating system (NOS) 1180, an open virtual switch (OVS) 1183, a backbone edge bridge (BEB) 1182, a backbone core bridge (BCB) 1181, a virtual network function (VNF) 1176, and/or provider backbone bridging-traffic engineering (PBB-TE) 1177. One or more of the vehicles 805 may be a space vehicle, an airborne vehicle, a terrestrial vehicle, or a marine vehicle. In some embodiments, the space vehicle is a satellite, and the satellite is a geosynchronous earth orbit (GEO) satellite, a low earth orbit (LEO) satellite, a medium earth orbit (MEO) satellite, or a super GEO satellite.

During operation of the disclosed system, the operations manager 1120 of the NOC 1130 receives a user demand from the external network 1171. The user demand specifies a desired amount of resources (e.g., bandwidth, etc.) from the internal networks 1170a, 1170b to be used by (shared with) users 1179 associated with the external network 1171. The operations manager 1120 of the NOC 1130 also receives KPIs from at least one of the internal networks 1170a, 1170b.

After the operations manager 1120 of the NOC 1130 receives the user demand and the KPIs, the operations manager 1120 of the NOC 1130 analyzes the user demand and the KPIs to determine whether at least one of the internal networks 1170a, 1170b has available resources that can be shared with the users 1177b. When the operations manager 1120 of the NOC 1130 determines that at least one of the internal networks 1170a, 1170b has available resources, the operations manager 1120 of the NOC 1130 will notify the SDN controller 1165 of the NOC 1130 to allow the users 1177b associated with the external network 1171 to connect to the internal networks 1170a, 1170b according to the available resources. The SDN controller 1165 of the NOC 1130 will then allow a specific number of users 1177b to connect to the internal networks 1170a, 1170b according to the amount of available resources. Then, the users 1177b that are allowed to connect to the internal networks 1170a, 1170b will proceed to connect to the internal networks 1170a, 1170b via UNI 1186c.

It should be noted that the SDN controller 1165 of the NOC 1130 controls connections (switching) of the ENNIs 1184, the INNIs 1185, and the UNIs 1186 of the system.

FIG. 12 is a diagram 1200 showing further details of the operations manager 1120 of FIG. 11, in accordance with at least one embodiment of the present disclosure. In this figure, the operations manager 1120 is shown to comprise the database (e.g., system configuration database) 1140 (refer to FIG. 11) and further comprise an XML-based configuration data translator 1210. The database 1140 comprises a startup configuration (Cfg) database 1215, a running configuration database 1225, and a candidate configuration database 1235. The database 1140 receives policy management information, network topology information, service management information, and network state of health and performance information to be stored within its databases 1215, 1225, 1235.

During operation of the disclosed system, the operations manager 1120 generates XML models 1220a, 1220b, 1220c, 1220d, 1220n for configurations for units (e.g., switches 1230a, routers 1230b, MODEMs 1230c, and other devices 1230d) for the configurable payload 815 (refer to FIG. 8) according to the global policy 891 (refer to FIG. 8). After the XML models 1220a, 1220b, 1220c, 1220d, 1220n have been generated, the XML-based configuration data translator 1210 operates as a translator 1240 to translate the XML models 1220a, 1220b, 1220c, 1220d, 1220n into proprietary flight software commands to be used as the configuration commands 892 (refer to FIG. 8).

FIG. 13 is a flow chart showing the method for operation of the disclosed system for an adaptive self-optimizing network using closed-loop feedback relating to FIG. 11, in accordance with at least one embodiment of the present disclosure. At the start 1310 of the method, a network operations center (NOC) receives user demand for users from an external network, step 1320. Then, the NOC receives key performance indicators (KPIs) from at least one internal network, step 1330. The NOC then determines whether at least one internal network has available resources by analyzing the key performance indicators and the user demand, step 1340. When the NOC determines that there are available resources, the NOC allows at least some of the users from the external network to connect to at last one internal network to the available resources, step 1350. Then, at least some of the users from the external network connect to at least one internal network via at least one user-to-network interface (UNI), step 1360. Then, the method ends, step 1370.

FIG. 14 is a flow chart showing the method for configuring a configuration for a vehicle relating to FIG. 12, in accordance with at least one embodiment of the present disclosure. At the start 1410 of the method, XML models are generated for the configuration for the vehicle, step 1420. Then, configuration commands are generated for the vehicle according to XML models, step 1430. The configuration of the vehicle is then configured according to the configuration commands, step 1440. Then, the method ends, step 1450.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Further, the disclosure comprises examples according to the following Clauses:

Clause 1. A method for sharing network resources, the method comprising: receiving, by a network operations center (NOC), user demand for users from an external network; receiving, by the NOC, key performance indicators from at least one internal network; determining, by the NOC, whether the at least one internal network has available resources by analyzing the key performance indicators and the user demand; and allowing, by the NOC when the NOC determines that there are available resources, at least some of the users from the external network to connect to the at least one internal network according to the available resources.

Clause 2. The method of Clause 1, wherein the method further comprises connecting at least some of the users from the external network to the at least one internal network via at least one user-to-network interface (UNI).

Clause 3. The method of Clause 1 or 2, wherein the external network is connected to the at least one internal network via at least one external network-to-network interface (ENNI).

Clause 4. The method of any one of Clauses 1 to 3, wherein the NOC controls operations of the at least one internal network.

Clause 5. The method of any one of Clauses 1 to 4, wherein when there are more than one of the at least one internal network, the internal networks are connected to each other via at least one internal network-to-network interface (INNI).

Clause 6. The method of any one of Clauses 1 to 5, wherein users from the at least one internal network are connected to the at least one internal network via at least one user-to-network interface (UNI).

Clause 7. The method of any one of Clauses 1 to 6, wherein the external network and the at least one internal network each comprise at least one of a vehicle, a router, a network operating system (NOS), an open virtual switch (OVS), a backbone edge bridge (BEB), a backbone core bridge (BCB), a virtual network function (VNF), or provider backbone bridging-traffic engineering (PBB-TE).

Clause 8. The method of Clause 7, wherein the vehicle is one of a space vehicle, an airborne vehicle, a terrestrial vehicle, or a marine vehicle.

Clause 9. The method of Clause 8, wherein the space vehicle is a satellite, and wherein the satellite is one of a geosynchronous earth orbit (GEO) satellite, a low earth orbit (LEO) satellite, a medium earth orbit (MEO) satellite, or a super GEO satellite.

Clause 10. The method of any one of Clauses 1 to 9, wherein a software defined network (SDN) controller of the NOC controls connections of at least one external network-to-network interface (ENNI), at least one internal network-to-network interface (INNI), and at least one user-to-network interface (UNI).

Clause 11. A system for sharing network resources, the system comprising: an external network; at least one internal network; and a network operations center (NOC) to receive user demand for users from the external network, to receive key performance indicators from the at least one internal network, to determine whether the at least one internal network has available resources by analyzing the key performance indicators and the user demand, and to allow, when the NOC determines that there are available resources, at least some of the users from the external network to connect to the at least one internal network according to the available resources.

Clause 12. The system of Clause 11, wherein at least some of the users from the external network are connected to the at least one internal network via at least one user-to-network interface (UNI).

Clause 13. The system of Clause 11 or 12, wherein the external network is connected to the at least one internal network via at least one external network-to-network interface (ENNI).

Clause 14. The system of any one of Clauses 11 to 13, wherein the NOC is configured to control operations of the at least one internal network.

Clause 15. The system of any one of Clauses 11 to 14, wherein when there are more than one of the at least one internal network, the internal networks are connected to each other via at least one internal network-to-network interface (INNI).

Clause 16. The system of any one of Clauses 11 to 15, wherein users from the at least one internal network are connected to the at least one internal network via at least one user-to-network interface (UNI).

Clause 17. The system of any one of Clauses 11 to 16, wherein the external network and the at least one internal network each comprise at least one of a vehicle, a router, a network operating system (NOS), an open virtual switch (OVS), a backbone edge bridge (BEB), a backbone core bridge (BCB), a virtual network function (VNF), or provider backbone bridging-traffic engineering (PBB-TE).

Clause 18. The system of Clause 17, wherein the vehicle is one of a space vehicle, an airborne vehicle, a terrestrial vehicle, or a marine vehicle.

Clause 19. The system of Clause 18, wherein the space vehicle is a satellite, and wherein the satellite is one of a geosynchronous earth orbit (GEO) satellite, a low earth orbit (LEO) satellite, a medium earth orbit (MEO) satellite, or a super GEO satellite.

Clause 20. The system of any one of Clauses 11 to 19, wherein a software defined network (SDN) controller of the NOC is configured to control connections of at least one external network-to-network interface (ENNI), at least one internal network-to-network interface (INNI), and at least one user-to-network interface (UNI).

Clause 21. A method for an adaptive network of vehicles, the method comprising: receiving, by a global network operations center (GNOC), operator inputs; generating, by the GNOC, a global policy according to the operator inputs; generating, by at least one of the GNOC or a local gateway (GW), configuration commands for configurations for at least one of the vehicles based on the global policy; transmitting, by at least one of the GNOC or the local GW, the configuration commands to at least one of the vehicles; transmitting, by the local GW, key performance indicators to the GNOC; and revising, by the GNOC, the global policy according to the key performance indicators.

Clause 22. The method of Clause 21, wherein the method further comprises generating, by a regional network operations center (RNOC), a regional policy.

Clause 23. The method of Clause 22, wherein the method further comprises revising, by the GNOC, the global policy according to the regional policy.

Clause 24. The method of Clause 22 or 23, wherein the regional policy comprises at least one of admission control, mobility management, channel allocations, carrier allocations, bearer allocations, power management, or forward and/or return (FWD/RTN) scheduling policies.

Clause 25. The method of any one of Clauses 22 to 24, wherein the RNOC is located within a gateway (GW).

Clause 26. The method of any one of Clauses 21 to 25, wherein the GNOC (120) is located within a gateway (GW).

Clause 27. The method of any one of Clauses 21 to 26, wherein the global policy comprises at least one of beam allocations, capacity allocations, software-defined network (SDN) management, or admission control policy.

Clause 28. The method of any one of Clauses 21 to 27, wherein the operator inputs comprise at least one of frequency spectrum planning, traffic planning, or contingency plans.

Clause 29. The method of any one of Clauses 21 to 28, wherein the key performance indicators comprise at least one of subscriber demand, MODEM power profiles, beam and carrier utilization, session blocking rates, random access channel (RACH) success rates, bearer success rates, session setup latency statistics, or handover success rates.

Clause 30. The method of any one of Clauses 21 to 29, wherein the vehicles are space vehicles, high-altitude platforms, airborne vehicles, terrestrial vehicles, marine vehicles, or fixed terrestrial cellular or wireless base stations.

Clause 31. The method of Clause 30, wherein the space vehicles are satellites.

Clause 32. The method of Clause 31, wherein the satellites comprise one of a geosynchronous earth orbit (GEO) satellite constellation, a low earth orbit (LEO) satellite constellation, a medium earth orbit (MEO) satellite constellation, a supersynchronous GEO satellite constellation, or a hybrid satellite constellation comprising one or more constellations or constellation types.

Clause 33. The method of any one of Clauses 21 to 32, wherein the method further comprises: generating, by at least one of the GNOC or the local GW, extensible markup language (XML) models for the configurations for at least one of the vehicles according to the global policy; and generating, by at least one of the GNOC or the local GW, the configuration commands according to the XML models.

Clause 34. The method of any one of Clauses 21 to 33, wherein the method further comprises transmitting, by at least one of the vehicles, telemetry to at least one of the GNOC or the local GW.

Clause 35. A system for an adaptive network of vehicle, the system comprising: a global network operations center (GNOC) configured to receive operator inputs, to generate a global policy according to the operator inputs, to generate configuration commands for configurations for at least one of the vehicles based on the global policy, and to revise the global policy according to key performance indicators; and a local gateway (GW) configured to transmit the key performance indicators to the GNOC, wherein at least one of the local GW or the GNOC are further configured to transmit the configuration commands to at least one of the vehicles.

Clause 36. The system of Clause 35, wherein the system further comprises a regional network operations center (RNOC) configured to generate a regional policy.

Clause 37. The system of Clause 36, wherein the GNOC is further configured to revise the global policy according to the regional policy.

Clause 38. The system of Clause 36 or 37, wherein the regional policy comprises at least one of admission control, mobility management, channel allocations, carrier allocations, bearer allocations, power management, or forward and/or return (FWD/RTN) scheduling policy.

Clause 39. A method for configuring a configuration for a vehicle, the method comprising: generating XML models for the configuration for the vehicle; generating configuration commands for the vehicle according to the XML models; and configuring the configuration for the vehicle according to the configuration commands.

Clause 40. The method of Clause 39, wherein the XML models are generated according to a global policy.

Clause 41. A system for sharing network resources, the system comprising: an external network; at least one internal network; and a network operations center (NOC) to perform the method of any one of Clauses 1 to 10.

Clause 42. A system for an adaptive network of vehicle, the system comprising: a global network operations center (GNOC) configured to perform the method of any one of Clauses 21 to 34.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

I claim:

1. A method for an adaptive network of vehicles, the method comprising:
  receiving, by a global network operations center (GNOC), operator inputs;
  generating, by the GNOC, a global policy according to the operator inputs;
  generating, by at least one of the GNOC or a local gateway (GW), configuration commands for configuring at least one of the vehicles based on the global policy;
  transmitting, by at least one of the GNOC or the local GW, the configuration commands to at least one of the vehicles;
  transmitting, by the local GW, key performance indicators to the GNOC; and
  revising, by the GNOC, the global policy according to the key performance indicators.

2. The method of claim 1, further comprising generating, by a regional network operations center (RNOC), a regional policy.

3. The method of claim 2, further comprising revising, by the GNOC, the global policy according to the regional policy.

4. The method of claim 2, wherein the regional policy comprises at least one of admission control, mobility management, channel allocations, carrier allocations, bearer allocations, power management, or forward and/or return (FWD/RTN) scheduling policies.

5. The method of claim 2, wherein the RNOC is located within a gateway (GW).

6. The method of claim 5, wherein the GNOC is located within the GW.

7. The method of claim 1, wherein the global policy comprises at least one of beam allocations, capacity allocations, software-defined network (SDN) management, or admission control policy.

8. The method of claim 1, wherein the operator inputs comprise at least one of frequency spectrum planning, traffic planning, or contingency plans.

9. The method of claim 1, wherein the key performance indicators comprise at least one of subscriber demand, MODEM power profiles, beam and carrier utilization, session blocking rates, random access channel (RACH) success rates, bearer success rates, session setup latency statistics, or handover success rates.

10. The method of claim 1, wherein the at least one of the vehicles is a space vehicle, a high-altitude platform, an airborne vehicle, a terrestrial vehicle, a marine vehicle, or a fixed terrestrial cellular or wireless base station.

11. The method of claim 10, wherein the space vehicle is a satellite.

12. The method of claim 11, wherein the satellite comprises a geosynchronous earth orbit (GEO) satellite constellation, a low earth orbit (LEO) satellite constellation, a medium earth orbit (MEO) satellite constellation, a supersynchronous GEO satellite constellation, or a hybrid satellite constellation comprising one or more constellations or constellation types.

13. The method of claim 1, further comprising: generating, by at least one of the GNOC or a local gateway (GW), extensible markup language (XML) models for the configurations for the at least one of the vehicles according to the global policy; and generating, by at least one of the GNOC or the local GW, the configuration commands according to the XML models.

14. The method of claim 13, further comprising transmitting, by the at least one of the vehicles, telemetry to at least one of the GNOC or the local GW.

15. A system for an adaptive network of vehicles, the system comprising one or more processors programmed to perform the following operations:
receive operator inputs;
generate a global policy according to the operator inputs;
generate configuration commands for configuring at least one of the vehicles based on the global policy; and
revise the global policy according to key performance indicators; and
transmit the key performance indicators to the a global network operations center (GNOC), wherein at least one of a local gateway (GW) or the GNOC are further configured to transmit the configuration commands to the at least one of the vehicles.

16. The system of claim 15, further comprising a regional network operations center (RNOC) configured to generate a regional policy.

17. The system of claim 16, wherein the GNOC is further configured to revise the global policy according to the regional policy.

18. The system of claim 17, wherein the regional policy comprises at least one of admission control, mobility management, channel allocations, carrier allocations, bearer allocations, power management, or forward and/or return (FWD/RTN) scheduling policy.

19. A non-transitory computer-readable media comprising computer-executable instructions that, when executed by one or more processors, cause the one or more processors to perform the following operations:
receiving, by a global network operations center (GNOC), operator inputs;
generating, by the GNOC, a global policy according to the operator inputs;
generating, by at least one of the GNOC or a local gateway (GW), configuration commands for configuring at least one of the vehicles based on the global policy;
transmitting, by at least one of the GNOC or the local GW, the configuration commands to at least one of the vehicles;
transmitting, by the local GW, key performance indicators to the GNOC; and
revising, by the GNOC, the global policy according to the key performance indicators.

20. The non-transitory computer-readable media of claim 19, wherein the global policy comprises at least one of beam allocations, capacity allocations, software-defined network (SDN) management, or admission control policy.

* * * * *